US012230036B2

(12) United States Patent
Donderici

(10) Patent No.: US 12,230,036 B2
(45) Date of Patent: Feb. 18, 2025

(54) SYSTEM AND METHOD TO HELP DETERMINE INTENT OF THIRD-PARTY AUTONOMOUS VEHICLE

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 434 days.

(21) Appl. No.: 17/846,783

(22) Filed: Jun. 22, 2022

(65) Prior Publication Data

US 2023/0419679 A1 Dec. 28, 2023

(51) Int. Cl.
*G06V 10/80* (2022.01)
*G06V 10/774* (2022.01)
*G06V 20/58* (2022.01)
*G08G 1/017* (2006.01)

(52) U.S. Cl.
CPC ............ *G06V 20/58* (2022.01); *G06V 10/774* (2022.01); *G06V 10/80* (2022.01); *G08G 1/017* (2013.01); *G06V 2201/08* (2022.01)

(58) Field of Classification Search
CPC ...... G06V 20/58; G06V 10/774; G06V 10/80; G06V 2201/08; G08G 1/017
See application file for complete search history.

(56) References Cited

U.S. PATENT DOCUMENTS 10,807,230 B2 * 10/2020 Szatmary ................. G01S 7/51
2022/0405517 A1 * 12/2022 Shi ....................... G06N 3/0442

* cited by examiner

*Primary Examiner* — Chuong A Ngo
(74) *Attorney, Agent, or Firm* — Michael DiCato

(57) ABSTRACT

Particular embodiments described herein provide for a system and method for determining an intent of a third-party autonomous vehicle by an autonomous vehicle. The method can include identifying the third-party autonomous vehicle, identifying a third-party autonomous vehicle behavior signature associated with the third-party autonomous vehicle, capturing sensor data related to the third-party autonomous vehicle, analyzing the captured sensor data to determine behaviors of the third-party autonomous vehicle, and using a third-party autonomous vehicle behavior signature to determine if the behaviors of the third-party autonomous vehicle indicate a specific intent of the third-party autonomous vehicle. The third-party autonomous vehicle behavior signature can be created by identifying behaviors of the third-party autonomous vehicle and associating the behaviors with an intent of the third-party autonomous vehicle.

20 Claims, 15 Drawing Sheets

SYSTEM AND METHOD TO HELP DETERMINE INTENT OF THIRD-PARTY AUTONOMOUS VEHICLE

TECHNICAL FIELD OF THE DISCLOSURE

The present disclosure relates generally using a vehicle and, more specifically, to devices and methods for determining an intent of a third-party autonomous vehicle.

BACKGROUND

An autonomous vehicle (AV) is a vehicle that is capable of sensing and navigating its environment with little or no user input. The AV may sense its environment using sensing devices such as radio detection and ranging (RADAR), light detection and ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying FIGURES, wherein like reference numerals represent like parts, in which.

Figure 1:
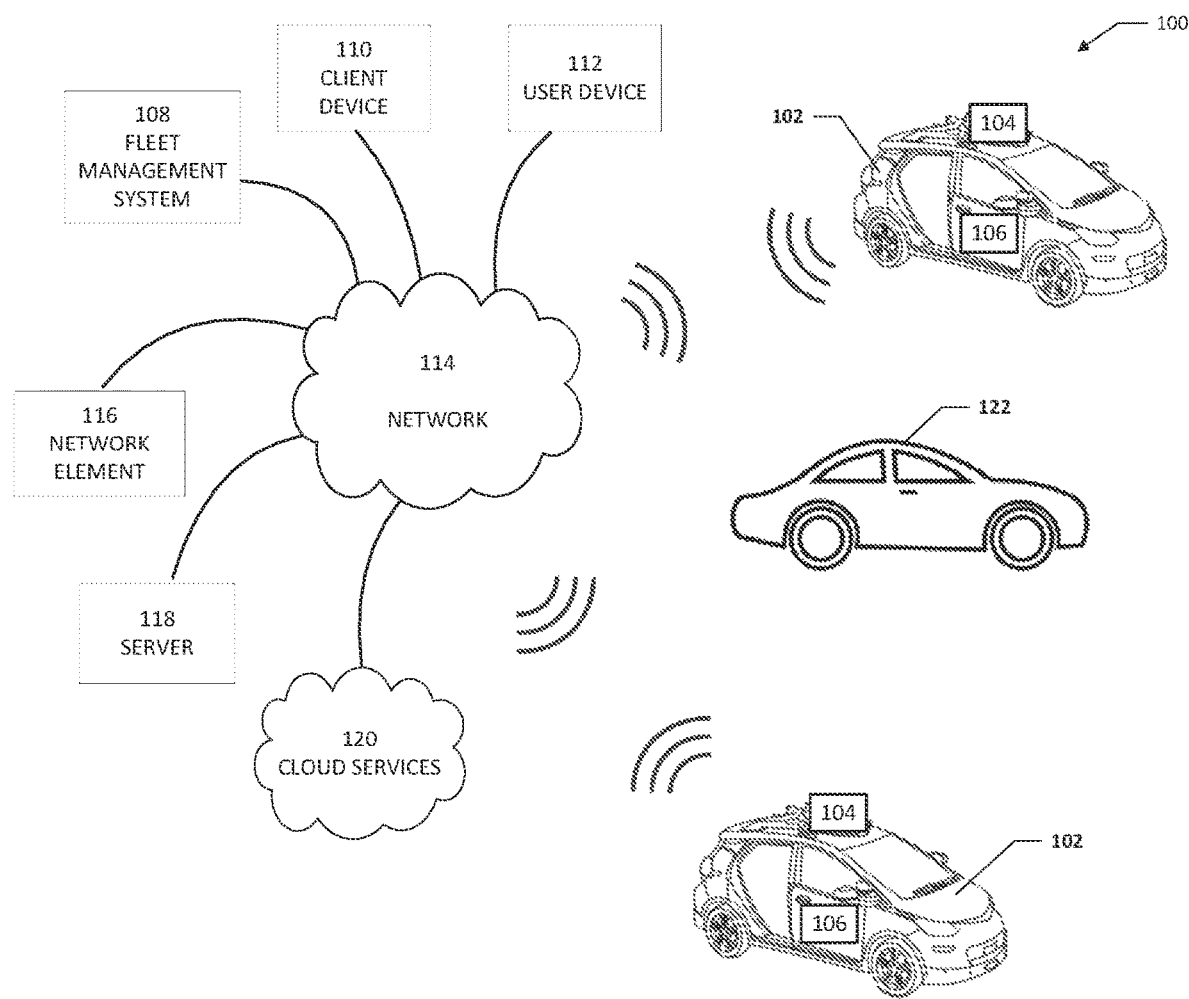
FIG. 1 shows an autonomous vehicle environment according to some embodiments of the present disclosure.

The FIGURES of the drawings are not necessarily drawn to scale, as their dimensions can be varied considerably without departing from the scope of the present disclosure.

DESCRIPTION OF EXAMPLE EMBODIMENTS OF THE DISCLOSURE

Overview

The demand for autonomous vehicles (AV) has been rising as more and more companies are offering ridehail, rideshare, and delivery service using AVs. As the demand for AVs increases, more and more companies are emerging to build AVs with each company having their own type of vehicle, driving behaviors, etc. Current, there is not communication between AVs from different companies and there is no standardization on the driving behavior of the AVs. As the number of AVs on the road increases, it can be important for each of the AVs to detect other AVs and accurately predict the behavior of the other AVs. AVs often behave significantly different compared to human drivers and some prediction models used by AV are trained only for human drivers and are not trained for other AVs. More and more companies are developing and using Therefore, improved technology for AVs is needed.

A system and method for determining an intent of a third-party autonomous vehicle can help to overcomes these problems. More specifically, the system can allow the AV to collect sensor data related to a third-party vehicle. The third-party vehicle can be a third-party autonomous vehicle. The collected sensor data can be used to create a profile that can be used to identify the third-party vehicle. Also, the collected sensor data can be used to determine one or more behaviors of the third-party vehicle that precede an action by the third-party vehicle. For example, before the third-party vehicle turns to the right, the third-party vehicle may make a small turn to the left or right in preparation for the right-hand turn. In another example, before the third-party vehicle speeds up or slows down, the third-party vehicle may make an adjustment to the third-party vehicle's LIDAR system, visual camera system, or some other detectable sensor modification or adjustment. The collected sensor data can be used to create perceptions related to the third-party vehicle and predictions on the actions of the third-party vehicle based on the created perception. The created perceptions and predictions can be associated with the third-party vehicle and stored as a behavior signature. A plurality of behavior signatures can be associated with the third-party vehicle and stored as a third-party behavior signature for the third-party vehicle.

When the AV is in an environmental setting such as on a road, the AV's sensors can be used to collect data and the collected data can be used to determine a specific identity of a third-party vehicle. Once the specific identity of the third-party vehicle is determined, a third-party behavior signature associated with the third-party vehicle can be used to predict the behavior of the third-party vehicle. The third-party behavior signature for the third-party vehicle can be created by deep learning modules based on previously received data related to the third-party vehicle. Third-party behavior signatures for a plurality of vehicles can be stored in a fleet management system. In some examples, once an AV identifies a specific third-party vehicle, the AV can request the third-party behavior signature from the fleet management system. This can save memory space on the AV as only relevant third-party behavior signatures would need to be stored on the onboard controller of the AV. Also, if the number of third-party behavior signatures is relatively large, the AV may not have the resources to search a large database for the correct third-party behavior signature. In some examples, the AV can request the third-party behavior signature when the AV detects the third-party vehicle so the AV has the time to acquire the third-party behavior signature from the fleet management system.

Embodiments of the present disclosure provide a method for-determining that an autonomous vehicle is preparing to perform an action, determining an indicator that is not perceivable by a human but is perceivable by a third-party autonomous vehicle, and activating the indicator before the action is performed. The autonomous vehicle is not in direct communication with the autonomous third-party vehicle. In some examples, the indicator is a short burst of infrared light.

Also, another method can include determining an intent of a third-party vehicle by an autonomous vehicle. The method can include identifying the third-party vehicle, identifying a third-party behavior signature associated with the third-party vehicle, capturing sensor data related to the third-party vehicle, analyzing the captured sensor data to determine behaviors of the third-party vehicle, and using the third-party behavior signature to determine if the behaviors of the third-party vehicle indicate a specific intent of the third-party vehicle. The third-party behavior signature can be created by identifying behaviors of the third-party vehicle and associating the behaviors with an intent of the third-party vehicle. In some examples, the behaviors associated with the intent are not perceivable by a person. The third-party vehicle can be identified using a visual image from camera sensors, using wireless signals originating from the third-party vehicle, or some other means of identifying the third-party vehicle. The third-party behavior signature can be stored in a network element and is communicated to the autonomous vehicle after the third-party vehicle is identified by the autonomous vehicle. In some examples, the third-party vehicle can be an autonomous vehicle. Also, the behaviors of the third-party vehicle that indicate a specific intent can be unique to the third-party vehicle. In addition, the autonomous vehicle is not in direct communication with the third-party vehicle.

In addition, a-vehicle for determining an intent of a third-party autonomous vehicle can include a sensor suite including external vehicle sensors to sense an environment and generate sensor data, where the environment includes the third-party autonomous vehicle and a perception system. The perception system can determine a specific identity of the third-party autonomous vehicle, determine a behavior of the third-party autonomous vehicle, and predict an action by the third-party autonomous vehicle based on the identity of the third-party autonomous vehicle and the determined behavior of the third-party autonomous vehicle. The determined behavior of the third-party autonomous vehicle is not perceivable by a person. The third-party autonomous vehicle can be identified using a visual image from camera sensors in the sensor suite, using light detection and ranging (LIDAR), using wireless signals originating from the third-party autonomous vehicle, or some other means. The vehicle can also include a third-party autonomous behavior signature, where the third-party autonomous behavior signature is associated with the third-party autonomous vehicle and is used to predict the action by the third-party autonomous vehicle based on the identity of the third-party autonomous vehicle and the determined behavior of the third-party autonomous vehicle. In some examples, the third-party autonomous behavior signature was created by previously identifying behaviors of the third-party vehicle and associating the behaviors with an intent of the third-party vehicle. The third-party behavior signature can be stored in a network element and communicated to the vehicle after the third-party autonomous vehicle is identified by the vehicle.

In some examples, the determined behavior of the third-party autonomous vehicle is are unique to the third-party vehicle. The vehicle can be an autonomous vehicle that is not in direct communication with the third-party autonomous vehicle.

Further, a method can include training a system to identify a specific third-party autonomous vehicle using data collected by a sensor suite on an autonomous vehicle, training the system to recognize one or more behaviors of the specific third-party autonomous vehicle that precede a specific action by the specific third-party autonomous vehicle, and create a profile for the specific third-party autonomous vehicle, wherein the profile includes features of the specific third-party autonomous vehicle that can be used to recognize the specific third-party autonomous vehicle, the recognized one or more behaviors signatures, and the specific action. The method can also include communicating the profile to the autonomous vehicle, identifying the specific third-party autonomous vehicle using data collected by a sensor suite on an autonomous vehicle, identifying when the specific third-party autonomous vehicle exhibits the one or more behavior signatures, and determining an intent of the specific third-party autonomous vehicle to perform the specific action in the behavior signature that is associated with the one or more behaviors. In some examples, the exhibited the one or more behaviors of the third-party autonomous vehicle are not perceivable by a person. The third-party autonomous vehicle can be identified using a visual image from camera sensors in the sensor suite, using wireless signals originating from the third-party autonomous vehicle, or some other means used to identify the third-party autonomous vehicle. The one or more behaviors of the specific third-party autonomous vehicle can be unique to the third-party autonomous vehicle. The vehicle is not in direct communication with the third-party autonomous vehicle As will be appreciated by one skilled in the art, aspects of the present disclosure, in particular aspects of determining an intent of a third-party autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as an "engine," a "circuit," a "module," or a "system." Functions described in this disclosure may be implemented as an algorithm executed by one or more hardware processing units (e.g., one or more microprocessors) of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied (e.g., stored) thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings. Other features and advantages of the disclosure will be apparent from the following description and the claims.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art. In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings. As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

It is to be understood that other embodiments may be utilized and structural changes may be made without departing from the scope of the present disclosure. Substantial flexibility is provided by an electronic device in that any suitable arrangements and configure ration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Example Autonomous Vehicle Environment

FIG. 1 shows an AV environment 100 according to some embodiments of the present disclosure. The AV environment 100 can include AVs 102, a fleet management system 108, a client device 110, and a user device 112. In some examples, the AV environment 100 includes a third-party vehicle 122. The third-party vehicle 122 is not controlled by the fleet management system 108 and movement of the third-party vehicle 122 may be less predictable than other AVs 102 or even human drivers.

Each of the AVs 102 can include an onboard controller 104 and a sensor suite 106. The onboard controller 104 controls the AV 102 and helps facilitate communication with the AV 102. The onboard controller 104 is described in more detail in FIG. 3 and below. The sensor suite 106 detects the environment inside and outside of the AV 102 and generates sensor data describing the surround environment. Certain sensors of the sensor suite 106 are described further in relation to FIG. 4 and below.

Each of the AVs 102, the fleet management system 108, the client device 110, and/or the user device 112 can be in communication using network 114. In addition, each of the AVs 102, the fleet management system 108, the client device 110, and/or the user device 112 can be in communication with one or more network elements 116, one or more servers 118, and cloud services 120 using the network 114. In other embodiments, the AV environment 100 may include fewer, more, or different components. For example, the AV environment 100 may include a different number of AVs 102 with some AVs 102 including the onboard controller 104 and some AVs 102 not including the onboard controller 104 (not shown). A single AV is referred to herein as AV 102, and multiple AVs are referred to collectively as AVs 102. For purpose of simplicity and illustration, FIG. 1 shows one client device 110 and one user device 112. In other embodiments, the AV environment 100 includes multiple third-party devices or multiple client devices.

In some embodiments, the AV environment 100 includes one or more communication networks (e.g., network 114) that supports communications between some or all of the components in the AV environment 100. The network 114 may comprise any combination of local area and/or wide area networks, using both wired and/or wireless communication systems. In one embodiment, the network uses standard communications technologies and/or protocols. For example, the network 114 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 114 may be represented using any suitable format, such as hypertext markup language (HTML) or extensible markup language (XML). In some embodiments, all or some of the communication links of the network 114 may be encrypted using any suitable technique or techniques.

The AV 102 is a vehicle that is capable of sensing and navigating its environment with little or no user input. The AV 102 may be a semi-autonomous or fully autonomous vehicle (e.g., a boat, an unmanned aerial vehicle, a driverless car, etc.). Additionally, or alternatively, the AV 102 may be a vehicle that switches between a semi-autonomous state and a fully autonomous state and thus, the AV may have attributes of both a semi-autonomous vehicle and a fully autonomous vehicle depending on the state of the vehicle. The AV 102 may include a throttle interface that controls an engine throttle, motor speed (e.g., rotational speed of electric motor), or any other movement-enabling mechanism, a brake interface that controls brakes of the AV (or any other movement-retarding mechanism), and a steering interface that controls steering of the AV (e.g., by changing the angle of wheels of the AV). The AV 102 may additionally or alternatively include interfaces for control of any other vehicle functions (e.g., windshield wipers, headlights, turn indicators, air conditioning, etc.

Figure 3:
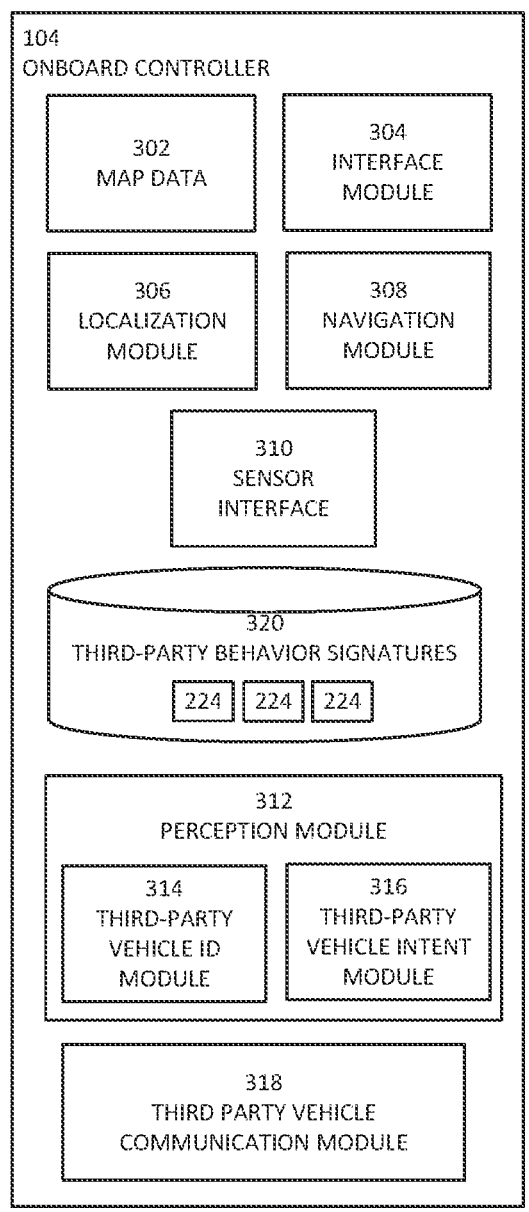
FIG. 3 is a block diagram illustrating an onboard controller of an AV according to some embodiments of the present disclosure.
Figure 4:
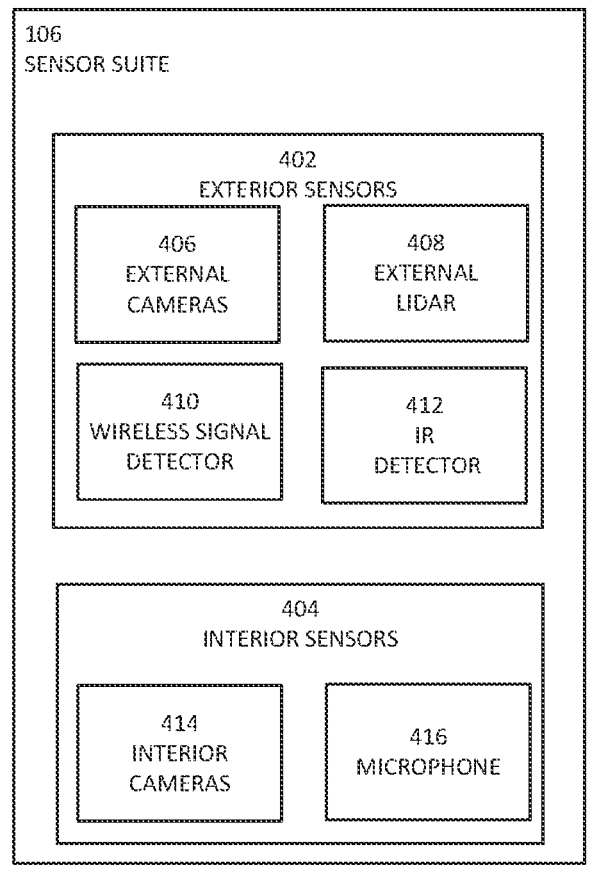
FIG. 4 illustrates a sensor suite according to some embodiments of the present disclosure.

In some embodiments, an AV 102 includes onboard controller 104 (shown in FIG. 3) and the sensor suite 106 (shown in FIG. 4). The sensor suite 106 can include a computer vision ("CV") system, localization sensors, and driving sensors. For example, the sensor suite 106 may include interior and exterior cameras, radar sensors, sonar sensors, LIDAR sensors, thermal sensors, wheel speed sensors, inertial measurement units (IMUS), accelerometers, microphones, strain gauges, pressure monitors, barometers, thermometers, altimeters, ambient light sensors, etc. The sensors may be located in various positions in and around the AV 102. For example, the AV 102 may have multiple cameras located at different positions around the exterior and/or interior of the AV 102.

The onboard controller controls operations and functionality of the AV 102. In some embodiments where the AV 102 includes the onboard controller 104, the onboard controller may control some operations and functionality of the onboard controller 104. In other embodiments where the AV 102 includes the onboard controller 104, the operations and functionality of the onboard controller 104 is separate from the onboard controller 104. In some embodiments, the onboard controller 104 is a general-purpose computer, but may additionally or alternatively be any suitable computing device. The onboard controller 104 is adapted for input/output (I/O) communication with other components of the AV 102 (e.g., the sensor suite 106, an UI module of the AV, etc.) and external systems (e.g., the fleet management system 108). The onboard controller 104 may be connected to the Internet via a wireless connection (e.g., via a cellular data connection). Additionally, or alternatively, the onboard controller 104 may be coupled to any number of wireless or wired communication systems.

The onboard controller 104 processes sensor data generated by the sensor suite 106 and/or other data (e.g., data received from the fleet management system 108) to determine the state of the AV 102. Based upon the vehicle state and programmed instructions, the onboard controller 104 modifies or controls behavior of the AV 102. In some embodiments, the onboard controller 104 implements an autonomous driving system (ADS) for controlling the AV 102 and processing sensor data from the sensor suite 106 and/or other sensors in order to determine the state of the AV 102. Based upon the vehicle state and programmed instructions, the onboard controller 104 modifies or controls driving behavior of the AV 102.

An AV 102 may also include a rechargeable battery that powers the AV 102. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AV 102 is a hybrid electric vehicle that also includes an internal combustion engine for powering the AV 102 (e.g., when the battery has low charge). In some embodiments, the AV 102 includes multiple batteries. For example, the AV 102 can include a first battery used to power vehicle propulsion, and a second battery used to power the onboard controller 104 and/or AV hardware (e.g., the sensor suite 106 and the onboard controller 104). The AV 102 may further include components for charging the battery (e.g., a charge port configured to make an electrical connection between the battery and a charging station).

The fleet management system 108 manages rideshare and delivery services using the AVs 102. Generally, a rideshare service is a service where users are picked up and dropped off in a vehicle (AV 102). The rideshare service is typically arranged using a website or app. Generally, a delivery service is a delivery of one or more items from one location to another location. In some embodiments, a delivery service is a service for picking up an item from a location of a business (e.g., a grocery store, a distribution center, a warehouse, etc.) and delivering the item to a location of a customer of the business. In other embodiments, a delivery service is a service for picking up an item from a customer of the business and delivering the item to a location of the business (e.g., for purpose of returning the item).

The fleet management system 108 may select an AV 102 from a fleet of AVs 102 to perform a particular rideshare, delivery service, and/or other tasks and instruct the selected AV 102 to autonomously drive to a particular location (e.g., an address to pick up a user). The fleet management system 108 sends a rideshare and/or delivery request to the AV 102. The rideshare and/or delivery request includes information associate with the rideshare and/or delivery service, information of a user requesting the rideshare and/or delivery (e.g., location, identifying information, etc.), information of a user to be picked up, an item to be delivered (e.g., size, weight, or other attributes), etc. In some embodiments, the fleet management system 108 may instruct one single AV 102 to perform multiple rideshare and/or delivery services. For example, the fleet management system 108 instructs the AV 102 to pick up riders and/or items from one location and deliver the riders and/or items to multiple locations, or vice versa. The fleet management system 108 also manages maintenance tasks, such as charging and servicing of the AVs 102. As shown in FIG. 1, each of the AVs 102 communicates with the fleet management system 108. The AVs 102 and fleet management system 108 may connect over a public network, such as the Internet. The fleet management system 108 is described further in relation to FIG. 2.

In some embodiments, the fleet management system 108 may also provide the AV 102 (and particularly, onboard controller 104) with system backend functions. The fleet management system 108 may include one or more switches, servers, databases, live advisors, or an automated voice response system (VRS). The fleet management system 108 may include any or all of the aforementioned components, which may be coupled to one another via a wired or wireless local area network (LAN). The fleet management system 108 may receive and transmit data via one or more appropriate devices and network from and to the AV 102, such as by wireless systems, such as 882.11x, general packet radio service (GPRS), and the like. A database at the fleet management system 108 can store account information such as subscriber authentication information, vehicle identifiers, profile records, behavioral patterns, and other pertinent subscriber information. The fleet management system 108 may also include a database of roads, routes, locations, etc. permitted for use by AV 102. The fleet management system 108 may communicate with the AV 102 to provide route guidance in response to a request received from the vehicle.

For example, based upon information stored in a mapping system of the fleet management system 108, the fleet management system 108 may determine the conditions of various roads or portions thereof. Autonomous vehicles, such as the AV 102, may, in the course of determining a navigation route, receive instructions from the fleet management system 108 regarding which roads or portions thereof, if any, are appropriate for use under certain circumstances, as described herein. Such instructions may be based in part on information received from the AV 102 or other autonomous vehicles regarding road conditions. Accordingly, the fleet management system 108 may receive information regarding the roads/routes generally in real-time from one or more vehicles.

The fleet management system 108 communicates with the client device 110. For example, the fleet management system 108 receives rideshare and/or delivery requests from the client device 110. The rideshare and/or delivery request may include information of the user to be picked up, information of one or more items to be picked up, information of the location for the pick up (e.g., store location, distribution center location, warehouse location, location of a customer, etc.), and so on. The fleet management system 108 can provide information associated with the rideshare and/or delivery request (e.g., information related to the identity of the user to be picked up, information of the status of the delivery process, etc.) to the client device 110.

The client device 110 may be a device (e.g., a computer system) of a user of the fleet management system 108. The user may be an entity or an individual. In some embodiments, a user may be a customer of another user. In an embodiment, the client device 110 is an online system maintained by a business (e.g., a retail business, a rideshare business, a package service business, etc.). The client device 110 may be an application provider communicating information describing applications for execution by the user device 112 or communicating data to the user device 112 for use by an application executing on the user device 112.

The user device 112 is one or more computing devices capable of receiving user input as well as transmitting and/or receiving data via the network. The user device 112 may be a device of an individual. The user device 112 communicates with the client device 110 to request use of the AV 102. For example, the user device 112 may send a user pick up request or delivery request to the client device 110 through an application executed on the user device 112. The user device 112 may receive from the client device 110 information associated with the request, such as the identity of the user to be picked up, a status of a package delivery process, etc. In one embodiment, the user device 112 is a conventional computer system, such as a desktop or a laptop computer. Alternatively, a user device 112 may be a device having computer functionality, such as a personal digital assistant (PDA), a mobile telephone, a smartphone, or another suitable device. A user device 112 is configured to communicate via the network. In one embodiment, a user device 112 executes an application allowing a user of the user device 112 to interact with the fleet management system 108. For example, a user device 112 executes a browser application to enable interaction between the user device 112 and the fleet management system 108 via the network. In another embodiment, a user device 112 interacts with the fleet management system 108 through an application programming interface (API) running on a native operating system of the user device 112, such as IOS® or ANDROID™.

Example Online System

Figure 2:
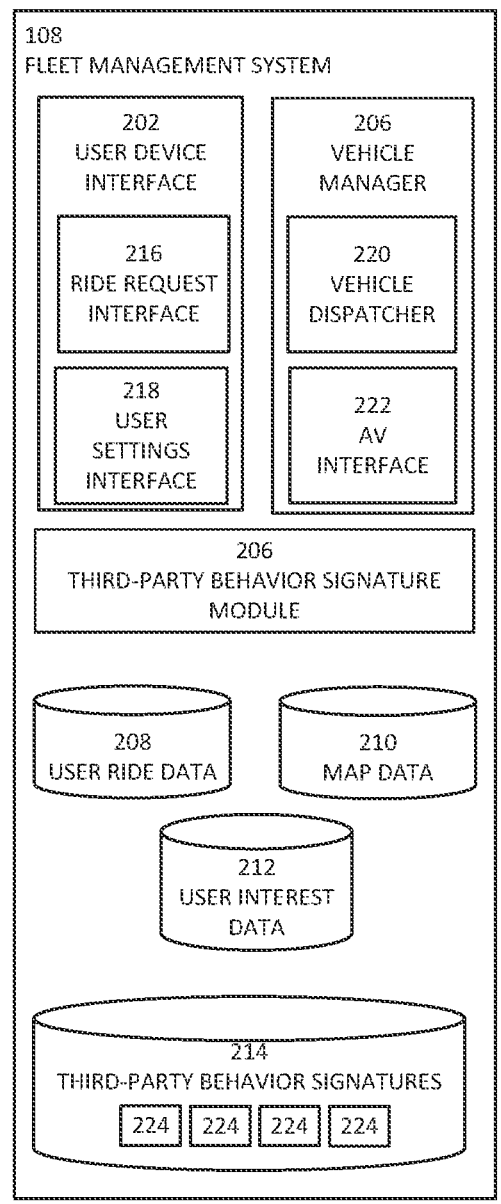
FIG. 2 is a block diagram illustrating a fleet management system according to some embodiments of the present disclosure.

FIG. 2 is a block diagram illustrating the fleet management system 108 according to some embodiments of the present disclosure. The fleet management system 108 can include a user device interface 202, a vehicle manager 204, third-party behavior signature module 206, user ride data 208, map data 210, user interest data 212, and third-party vehicle behavior signatures database 214. Each of the user ride data 208, the map data 210, the user interest data 212, and the third-party vehicle behavior signatures database 214 can be located in one or more data stores. In some examples, the one or more datastores are one or more databases. The user device interface 202 includes a ride request interface 216 and user settings interface 218. The vehicle manager 204 includes a vehicle dispatcher 220 and an AV interface 222. The third-party vehicle behavior signatures database 214 includes one or more behavior signatures 224 for third-party vehicles. A specific third-party behavior signature can include a plurality of behavior signatures 224 for the specific third-party vehicle. Alternative configurations, different or additional components may be included in the fleet management system 108. Further, functionality attributed to one component of the fleet management system 108 may be accomplished by a different component included in the fleet management system 108 or a different system (e.g., the onboard controller of an AV 102).

The user device interface 202 is configured to communicate with third-party devices (e.g., the user device 112) that provide a UI to users. For example, the user device interface 202 may be a web server that provides a browser-based application to third-party devices, or the user device interface 202 may be a mobile app server that interfaces with a mobile app installed on third-party devices. For example, the user device interface 202 may provide one or more apps or browser-based interfaces that can be accessed by users, such as the users using user device 112. The user device interface 202 includes the ride request interface 216, that enables the users to submit requests to a ride service provided or enabled by the fleet management system 108.

The user device interface 202 further includes the user settings interface 218 that the user can use to select ride settings. The user ride data 208 stores ride information associated with users of the ride service. The user ride data 208 may include an origin location and a destination location for a user's current ride. The user ride data 208 may also include historical ride data for a user, including origin and destination locations, dates, and times of previous rides taken by a user. The map data 210 stores a detailed map of environments through which the AVs 102 may travel. The map data 210 includes data describing roadways, such as e.g., locations of roadways, connections between roadways, roadway names, speed limits, traffic flow regulations, toll information, etc.

The user interest data 212 stores data indicating user interests. The fleet management system 108 may include one or more learning modules (not shown in FIG. 4) to learn user interests based on user data. For example, a learning module may compare locations in the user ride data 208 with map data 210 to identify places the user has visited or plans to visit. The vehicle manager 204 manages and communicates with a fleet of AVs (e.g., the AVs 102). The vehicle manager 204 may assign AVs 102 to various tasks and direct the movements of the AVs 102 in the fleet. The vehicle manager 204 includes the vehicle dispatcher 220 and the AV interface 222. The vehicle dispatcher 220 selects AVs from the fleet to perform various tasks and instructs the AVs to perform the tasks. The AV interface 222 interfaces with the AVs 102, and in particular, with the onboard controller 104 of the AVs 102. The AV interface 222 allows for bi-directional wireless communication between the fleet management system 108 and AVs 102. The AV interface 222 may receive sensor data from the AVs 102, such as camera images, captured sound, and other outputs from the sensor suite 106.

The third-party behavior signature module 206 can receive sensor data from AV 102 related to a specific third-party vehicle 122 and create behaviors with associated behavior signatures 224 for the third-party vehicles 122. In some examples, the received sensor data is labeled with an indicator that indicates the data is related to the third-party vehicle 122 to allow the onboard controller 104 and the fleet management system 108 to learn to treat the third-party vehicle 122 differently than other AVs 102 and/or human drivers.

For example, the collected sensor data from the sensor suite 106 can be used by the third-party vehicle identification module 314 (illustrated in FIG. 3) to determine one or more behaviors of the third-party vehicle 122 that precede an action by the third-party vehicle 122. For example, before the third-party vehicle 122 turns to the right, the third-party vehicle 122 may make a small turn to the left or right in preparation for the right-hand turn. In another example, before the third-party vehicle 122 speeds up or slows down, the third-party vehicle 122 may make an adjustment to the third-party vehicle's LIDAR system. The collected sensor data from the sensor suite 106 can be used by the third-party behavior signature module 206 to create perceptions related to the third-party vehicle 122 and predictions on the actions of the third-party vehicle 122 based on the created perception. The created perceptions and predictions can be associated with the third-party vehicle 122 and stored as a third-party vehicle behavior signature 224 in the third-party vehicle behavior signatures database 214. The AV interface 222 can communicate the behavior signatures 224 stored in third-party vehicle behavior signatures database 214 to the AV 102. In some examples, the behaviors associated with the intent are not perceivable by a person.

Example Onboard Controller

FIG. 3 is a block diagram illustrating the onboard controller 104 of the AV 102 according to some embodiments of the present disclosure. The onboard controller 104 includes map data 302, an interface module 304, a localization module 306, a navigation module 308, a sensor interface 310, a perception module 312, a third-party vehicle communication module 318, and third-party vehicle behavior signatures database 320. The perception module 312 can include a third-party vehicle identification module 314 and a third-party vehicle intent module 316. The third-party vehicle behavior signatures database 320 can include the behavior signatures 224 in the third-party vehicle behavior signatures database 214 in the fleet management system 108 or a subset of the behavior signatures 224 in the third-party vehicle behavior signatures database 214 in the fleet management system 108. The third-party vehicle behavior signatures database 320 includes one or more behavior signatures 224 for third-party vehicles. In some examples, the third-party vehicle behavior signatures database 320 includes all of the behavior signatures 224 for third-party vehicles stored in the third-party vehicle behavior signatures database 214 in the fleet management system 108. In other examples, the third-party vehicle behavior signatures database 320 includes a subset of the behavior signatures 224 for third-party vehicles stored in the third-party vehicle behavior signatures database 214 in the fleet management system. For example, if a specific type of third-party vehicle is not in the environment of the AV 102 (e.g., a specific third-party vehicle that is not for sale in the country where the AV 102 is located), then the behavior signatures 224 the specific type of third-party vehicle in the environment of the AV 102 is not in the third-party vehicle behavior signatures database 320. Alternative configurations, different or additional components may be included in the onboard controller 104. Further, functionality attributed to one component of the onboard controller 104 may be accomplished by a different component included in the AV 102 or a different system (e.g., the fleet management system 108). For example, components and modules for conducting route planning, controlling movements of the AV 102, and other vehicle functions are not shown in FIG. 3.

The map data 302 stores a detailed map that includes a current environment of the AV 102. The map data 302 may include any of the map data 210 described in relation to FIG. 2. In some embodiments, the map data 302 stores a subset of the map data 210, (e.g., map data for a city or region in which the AV 102 is located.

The interface module 304 facilitates communications of the onboard controller 104 with other systems. For example, the interface module 304 supports communications of the onboard controller 104 with other systems (e.g., the fleet management system 108). The interface module 304 supports communications of the onboard controller 104 with other components of the AV 102. For example, the interface module 304 may retrieve sensor data generated by the sensor suite 106 and communicate with an UI module of the onboard controller 104.

The localization module 306 localizes the AV 102. The localization module 306 may use sensor data generated by the sensor suite 106 to determine the current location of the AV 102. The sensor data includes information describing an absolute or relative position of the AV 102 (e.g., data generated by GPS, global navigation satellite system (GNSS), IMU, etc.), information describing features surrounding the AV 102 (e.g., data generated by a camera, RADAR, SONAR, LIDAR, etc.), information describing motion of the AV 102 (e.g., data generated by the motion sensor), or some combination thereof. In some embodiments, the localization module 306 uses the sensor data to determine whether the AV 102 has entered a local area, such as a parking garage or parking lot where the AV 102 can be charged. In some other embodiments, the localization module 306 may send the sensor data to the fleet management system 108 and receive from the fleet management system 108 a determination whether the AV 102 has entered the local area.

In some embodiments, the localization module 306 determines whether the AV 102 is at a predetermined location (e.g., a destination of a delivery service). For example, the localization module 306 uses sensor data generated by the sensor suite 106 (or a sensor in the sensor suite 106) to determine the location of the AV 102. The localization module 306 may further compare the location of the AV 102 with the predetermined location to determine whether the AV 102 has arrived. The localization module 306 may provide locations of the AV 102 to the fleet management system 108.

The localization module 306 can further localize the AV 102 within the local area. For example, the localization module 306 determines a pose (position or orientation) of the AV 102 in the local area. In some embodiments, the localization module 306 localizes the AV 102 within the local area by using a model of the local area. The model may be a 2D or 3D representation of the surrounding area, such as a map or a 3D virtual scene simulating the surrounding area. In various embodiments, the localization module 306 receives the model of the local area from the fleet management system 108. The localization module 306 may send a request for the model to the fleet management system 108 and in response, receive the model of the local area. In some embodiments, the localization module 306 generates the request based on sensor data indicating a position or motion of the AV 102. For example, the localization module 306 detects that the AV 102 is in the local area or is navigated to enter the local area based on the sensor data and sends out the request in response to such detection. This process can be dynamic. For example, the localization module 306 may send new request to the fleet management system 108 as the AV 102 changes its position.

The localization module 306 may further localize the AV 102 with respect to an object in the local area. An example of the object is a building in the local area. The localization module 306 may determine a pose of the AV 102 relative to the building based on features in the local area. For example, the localization module 306 retrieves sensor data from one or more sensors (e.g., camera, LIDAR, etc.) in the sensor suite 106 that detect the features. The localization module 306 uses the sensor data to determine the pose of the AV 102.

The features may be lane markers, street curbs, driveways, and so on. A feature may be two-dimensional or three-dimensional.

The navigation module 308 controls motion of the AV 102. The navigation module 308 may control the motor of the AV 102 to start, pause, resume, or stop motion of the AV 102. The navigation module 308 may further control the wheels of the AV 102 to control the direction the AV 102 will move. In various embodiments, the navigation module 308 generates a navigation route for the AV 102 based on a location of the AV 102, a destination, and a map. The navigation module 308 may receive the location of the AV 102 from the localization module 306. The navigation module 308 receives a request to go to a location and, using map data 302, generates a route to navigate the AV 102 from its current location, which is determined by the localization module 306, to the location. The navigation module 308 may receive the destination from the fleet management system 108, through the interface module 304.

The sensor interface 310 interfaces with the sensors in the sensor suite 106. The sensor interface 310 may request data from the sensor suite 106 (e.g., by requesting that a sensor capture data in a particular direction or at a particular time). For example, in response to the user device location module 154 or another module determining a location of the user device in the AV 102 (e.g., based on images from an interior camera 414, or other sensors), the sensor interface 310 instructs the user device resource usage module 156 to utilize one or more resources of the user device. As another example, in response to the perception module 312 or another module determining that the one or more users have entered the passenger compartment of the AV 102, the sensor interface 310 instructs one or more of the interior sensors of the AV 102 to become active. The sensor interface 310 is configured to receive data captured by sensors of the sensor suite 106, including data from exterior sensors mounted to the outside of the AV 102, and data from interior sensors mounted in the passenger compartment of the AV 102. The sensor interface 310 may have subcomponents for interfacing with individual sensors or groups of sensors of the sensor suite 106, such as a camera interface, a LIDAR interface, a radar interface, a microphone interface, etc.

The perception module 312 identifies objects and/or other features captured by the sensor suite 106 of the AV 102. For example, the perception module 312 identifies objects in the environment of the AV 102 and captured by one or more sensors of the sensor suite 106 and/or one or more sensors of the user device. The perception module 312 may include one or more classifiers trained using machine learning to identify particular objects. For example, a multi-class classifier may be used to classify each object in the environment of the AV 102 as one of a set of potential objects, (e.g., a third-party vehicle, a pedestrian, or a cyclist). The perception module 312 may identify travel speeds of identified objects based on data from a radar sensor, (e.g., speeds at which other vehicles, pedestrians, or birds are traveling). As another example, the perception module 312 may identify distances to identified objects based on data (e.g., a captured point cloud) from a LIDAR sensor, (e.g., a distance to a particular vehicle, building, or other feature identified by the perception module 312).

More specifically, as illustrated in FIG. 3, the perception module 312 can include the third-party vehicle identification module 314. The third-party vehicle identification module can receive data from the sensors in the sensor suite 106 and use the data to identify a specific third-party vehicle. After the third-party vehicle is identified by the third-party vehicle identification module 314, the behavior signatures 224 s for the identified third-party vehicle can be acquired from the third-party vehicles behavior signatures database 320. The behavior signatures 224 for the identified third-party vehicle can be used by the third-party vehicle intent module 316 to predict an intent or next action of the third-party vehicle. In some examples, the behaviors associated with the intent are not perceivable by a person.

The perception module 312 may also identify other features or characteristics of objects in the environment of the AV 102 based on image data or other sensor data, for example, colors (e.g., the colors of Christmas lights), sizes (e.g., heights of people or buildings in the environment), makes and models of vehicles, pictures and/or words on billboards, etc. The perception module 312 may further process data from captured by interior sensors (e.g., interior cameras) to determine information about the interior environment in the AV 102. For example, the perception module 312 may perform facial recognition based on image data from the interior cameras to determine which user is seated in which position in the AV 102 and to determine a location of a user device. In some examples, the perception module 312 may use supplementary sensor data from the user device to determine information about the interior environment in the AV 102.

In some embodiments, the perception module 312 fuses data from one or more interior cameras with data from exterior sensors (e.g., exterior cameras 406) and/or map data 302 to identify environmental features being viewed by one or more users. The perception module 312 determines, based on an image of a user, a direction in which the user is looking, (e.g., a vector extending from the user and out of the AV 102 in a particular direction). The perception module 312 compares this vector to data describing features in the environment of the AV 102, including the features' relative location to the AV 102 (e.g., based on real-time data from exterior sensors and/or the AV's real-time location) to identify a feature in the environment being viewed by the user.

While a single perception module 312 is shown in FIG. 3, in some embodiments, the onboard controller 104 may have multiple perception modules (e.g., different perception modules for performing different ones of the perception tasks described above (e.g., object perception, speed perception, distance perception, feature perception, facial recognition, mood determination, sound analysis, gaze determination, etc.)).

The third-party vehicle communication module 318 can be used by the AV 102 to provide a signal or indictor to the third-party autonomous vehicle that the third-party autonomous vehicle can use to predict the behavior of the AV 102. For example, the third-party vehicle communication module 318 can determine that the AV 102 is preparing to perform an action, determine an indicator that is not perceivable by a human but is perceivable by the third-party autonomous vehicle 122, and activate the indicator before the action is performed. The third-party autonomous vehicle 122 can receive or perceive the indicator and use the indicator to predict the behavior of the AV 102. In some examples, the indicator is a short burst of infrared light, a change of one or more sensors on the AV 102, change of suspension, superfast flashes of light (e.g., less than 10 ms), or some other indicator. If the AV 102 is stationary, the AV 102 may turn its wheels to one side or the other or straighten the wheels to provide the indicator the third-party vehicle 122

Example Sensor Suite

FIG. 4 is a block diagram illustrating the sensor suite 106 of the AV 102 according to some embodiments of the present disclosure. The sensor suite 106 includes one or more exterior sensors 402 and one or more interior sensors 404. The exterior sensors 402 can be located outside of the AV 102 and help to identify environmental features of the environment outside of the AV 102, especially third-party vehicles 122. The interior sensors 404 can be located inside of the AV 102 and help to identify environmental features of the environment inside of the AV 102. The exterior sensors 402 can include one or more exterior cameras 406, at least one LIDAR sensor 408, a wireless signal detector 410, an infrared detector 412, and other sensors not shown (e.g., ultrasonic, a non-audible medium, radar, audio sensors, etc.). The interior sensors 404 can include one or more interior cameras 414, at least one interior microphone 416 and other sensors not shown. Alternative configurations, different or additional components may be included in the sensor suite 106. Further, functionality attributed to one component of the sensor suite 106 may be accomplished by a different component included in the AV 102 or a different system.

The exterior sensors 402 can include one or more exterior cameras 406, at least one LIDAR sensor 408, a wireless signal detector 410, and other sensors not shown to help identify third-party vehicles 122. For example, the exterior cameras 406 can capture images of the environment around the AV 102. The exterior sensors 402 of the sensor suite 106 may include multiple exterior cameras 406 to capture different views, (e.g., a front-facing camera, a back-facing camera, and side-facing cameras). One or more exterior cameras 406 may be implemented using a high-resolution imager with a fixed mounting and field of view. One or more exterior cameras 406 may have adjustable field of views and/or adjustable zooms. In some embodiments, the exterior cameras 406 capture images continually during operation of the AV 102. The exterior cameras 406 may transmit the captured images to a perception module 312 of the AV 102.

If the exterior sensors 402 of the sensor suite 106 includes a LIDAR sensor 408, the LIDAR sensor 408 measures distances to objects in the vicinity of the AV 102 using reflected laser light. The LIDAR sensor 408 may be a scanning LIDAR that provides a point cloud of the region scanned. The LIDAR sensor 408 may have a fixed field of view or a dynamically Figures field of view. The LIDAR sensor 408 may produce a point cloud that describes, among other things, distances to various objects in the environment of the AV 102. In addition, the exterior sensors 402 may include other sensors. For example, the exterior sensors 402 may include a radar sensor that can measure ranges and speeds of objects in the vicinity of the AV 102 using reflected radio waves. The radar sensor may be implemented using a scanning radar with a fixed field of view or a dynamic field of view. The radar sensor may include one or more articulating radar sensors, long-range radar sensors, short-range radar sensors, or some combination thereof.

The wireless signal detector 410 can detect wireless signals in the environment outside of the AV 102 that did not originate with the AV 102. For examples, the wireless signal detector 410 can detect WiFi signals, Bluetooth signals, beacon signals, and other signals. In some examples, the detected wireless signals may be used to identify a third-party vehicle 122. For example, a third-party vehicle 122 may emit a Bluetooth signal or beacon signal that includes an identifier of the third-party vehicle 122.

The interior sensors 404 can include one or more interior cameras 414, at least one interior microphone 416, and other sensors to identify environmental features of the environment inside of the AV 102 (e.g., a LIDAR sensor, at least one RADAR sensor, at least one IR sensor, at least one NFC sensor, at least one beacon sensor, etc.). The one or more interior cameras 414 can capture different views of the interior of the AV 102 (e.g., a front-facing camera, a back-facing camera, and side-facing cameras). The one or more interior cameras 414 may include a high-resolution imager with a fixed mounting and field of view and/or may have adjustable field of views and/or adjustable zooms. In some embodiments, the interior cameras 414 capture images continually during operation of the AV 102. In some embodiments, the one or more interior cameras 414 can be located on or near a front windshield of the AV 102 and/or on or near a back windshield of the AV 102.

The at least one interior microphone 416 can convert sound in the interior of the AV 102 into electrical signals. The sensor suite 106 may have multiple interior microphones 416 at various locations around the interior of the AV 102. The at least one interior microphone 416 may operate continually during operation of the AV 102, or may operate when sound is detected at the microphone and/or when a user is detected within a range of the at least one interior microphone 416.

Example System Summary

Figure 5A:
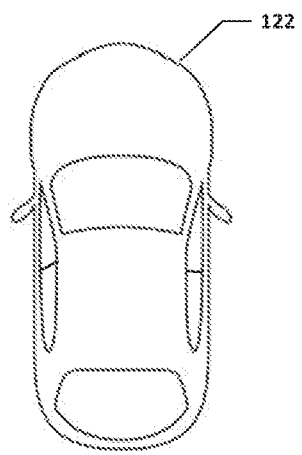
FIGS. 5A-5C illustrate an example system summary according to some embodiments of the present disclosure.
Figure 5A:
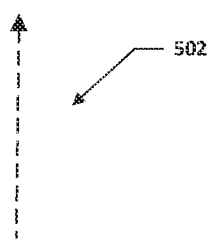
Figure 5A:
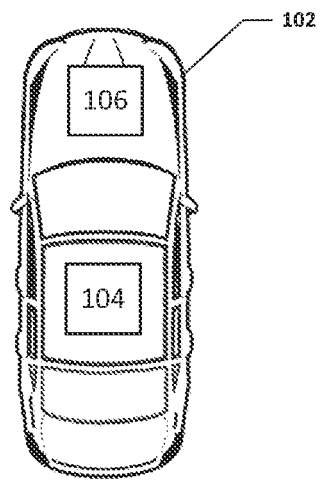
Figure 5B:
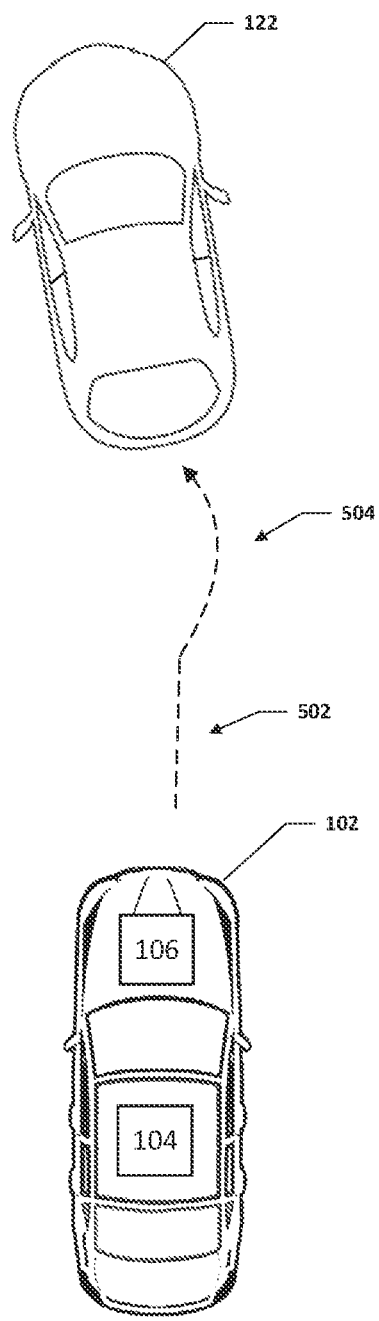
Figure 5C:
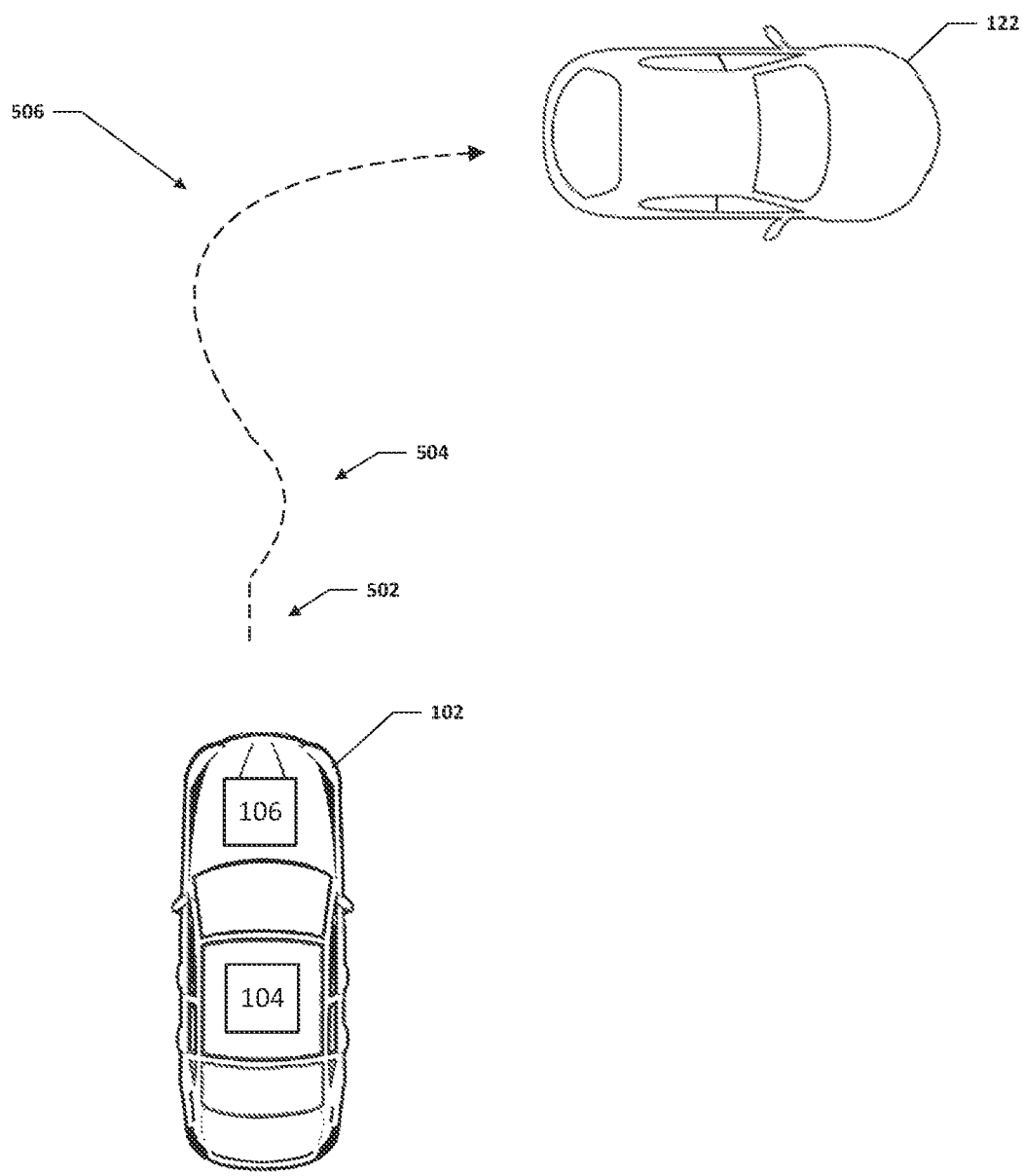

FIGS. 5A-5C illustrate an example system summary according to some embodiments of the present disclosure. In an example, AV 102 can be following a third-party vehicle 122. The AV 102 can include the onboard controller and the sensor suite 106. As illustrated in FIG. 5A, the sensor suite 106 can identify the third-party vehicle 122 is traveling in a relatively straight line 502. As illustrated in FIG. 5B, the sensor suite 106 can detect that the third-party vehicle 122 makes a small turn to the right and then to the left 504 and that the third-party vehicle 122 has deviated from traveling along the relatively straight line 502. As illustrated in FIG. 5C, the sensor suite 106 can detect that the third-party vehicle 122 has made a right hand turn 506.

In some examples, if the third-party vehicle 122 is unknown to the AV 102 and/or the fleet management system 108, the behavior of the third-party vehicle 122 traveling in a relatively straight line 502 (as illustrated in FIG. 5A), the third-party vehicle 122 making a small turn to the right and then to the left 504 and deviating from traveling along the relatively straight line 502 (as illustrated in FIG. 5B), and then the third-party vehicle 122 making a right hand turn 506 (as illustrated in FIG. 5C) can be sent to the third-party behavior signature module 206 in the fleet management system 108 from the AV 102. In addition, other sensor data collected by the sensor suite 106 relative to the third-party vehicle 122 can be sent to the third-party behavior signature module 206 in the fleet management system 108. The other sensor data can include images of the third-party vehicle 122 collected by the sensor suite 106, radar signals collected from the third-party vehicle 122, audio signals collected from the third-party vehicle 122, as well as other data collected by the sensor suite 106 that can be used by the third-party behavior signature module 206 as training to identify the specific type of third-party vehicle 122. Certain characteristics of the audio signals (tire noise or other operational sounds), and radar signatures can also be used to recognize the third-party vehicle 122. In addition to detecting the type of the third-party vehicle, the exact identity of the third-party vehicle 122 may also be determined from the above characteristics as well as visual signals such as plate number. The identity of the third-party vehicle 122, may be used, similar to the type of the vehicle for the same purposes described below. For example, if the target vehicle is one that has an older software version, or a small defect in operation, this kind of information can be used to make better prediction.

After the specific type of third-party vehicle 122 has been identified, the behavior of the third-party vehicle 122 traveling in a relatively straight line 502 (as illustrated in FIG. 5A), the third-party vehicle 122 making a small turn to the right and then to the left 504 and deviating from traveling along the relatively straight line 502 (as illustrated in FIG. 5B) can be added as a behavior of the third-party vehicle that indicates an intent of the third-party vehicle 122 to make a right hand turn 506 (as illustrated in FIG. 5C). The behavior of the third-party vehicle 122 traveling in a relatively straight line 502 (as illustrated in FIG. 5A) and making a small turn to the right and then to the left 504 before turning right can be added as a third-party behavior signature for the third-party vehicle and added to the third-party vehicle behavior signatures database 214 and the third-party vehicle behavior signatures database 320.

In another example, if the sensor suite 106 of the AV 102 is able to identify the third-party vehicle 122 and the third-party vehicle 122 is known to the AV 102. The behavior signatures 224 for the third-party vehicle 122 can be acquired from the third-party vehicle behavior signatures database 320. When the third-party vehicle 122 exhibits the behavior of the third-party vehicle 122 traveling in a relatively straight line 502 (as illustrated in FIG. 5A) and then making a small turn to the right and then to the left 504 and deviating from traveling along the relatively straight line 502 (as illustrated in FIG. 5B), the AV 102 can determine that the third-party vehicle 122 intends to make a right hand turn 506 (as illustrated in FIG. 5C).

While FIGS. 5A-5C illustrate the behavior of the third-party vehicle 122 traveling in a relatively straight line 502 (as illustrated in FIG. 5A) and the third-party vehicle 122 making a small turn to the right and then to the left 504 and deviating from traveling along the relatively straight line 502 (as illustrated in FIG. 5B) as a behavior that shows an intent of the third-party vehicle 122 making a right hand turn (as illustrated in FIG. 5C), other behaviors of the third-party vehicle 122 may be recognized that indicate an intent of the third-party vehicle 122 to make a right hand turn. For example, the LIDAR on the third-party vehicle 122 may change, the cameras on the third-party vehicle 122 may shift or move to move the viewpoint of the camera, or some other behaviors of the third-party vehicle 122 that may be recognized that indicate an intent of the third-party vehicle 122 to make a right-hand turn. In addition, certain type of radar or LIDAR emissions or scan patterns of the third-party vehicle 122 may change that may be recognized that indicate an intent. Third-party vehicle 122 may produce certain sounds or light patterns that can be used to recognize an intent. Third-party vehicle 122 may be driving on a certain part of the road, that can be used to recognize an intent. Also, different behaviors can be recognized by the AV 102 that shown an intent of the third-party vehicle 122. For example, if the third-party vehicle 122 is going to speed up or slow down, one or more sensors on the third-party vehicle 122 may change or one or more sensors on the third-party vehicle 122 may become active, the suspension of the third-party vehicle 122 may be raised or lowered, or the third-party vehicle 122 may emit super-fast flashes of light (e.g., less than 10 ms). In addition, if the third-party vehicle 122 is stationary, the third-party vehicle 122 may turn its wheels to one side or the other or straighten the wheels before the third-party vehicle 122 begins to move.

Figure 6A:
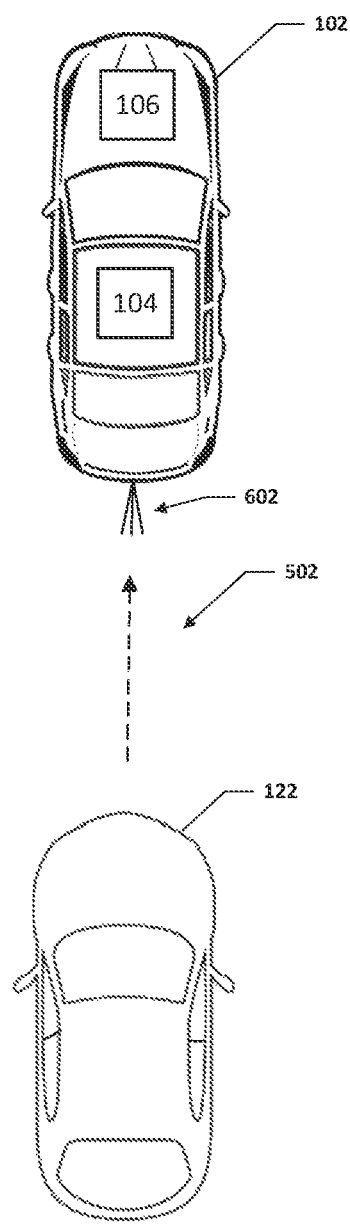
FIGS. 6A and 6B illustrate an example system summary according to some embodiments of the present disclosure.
Figure 6B:
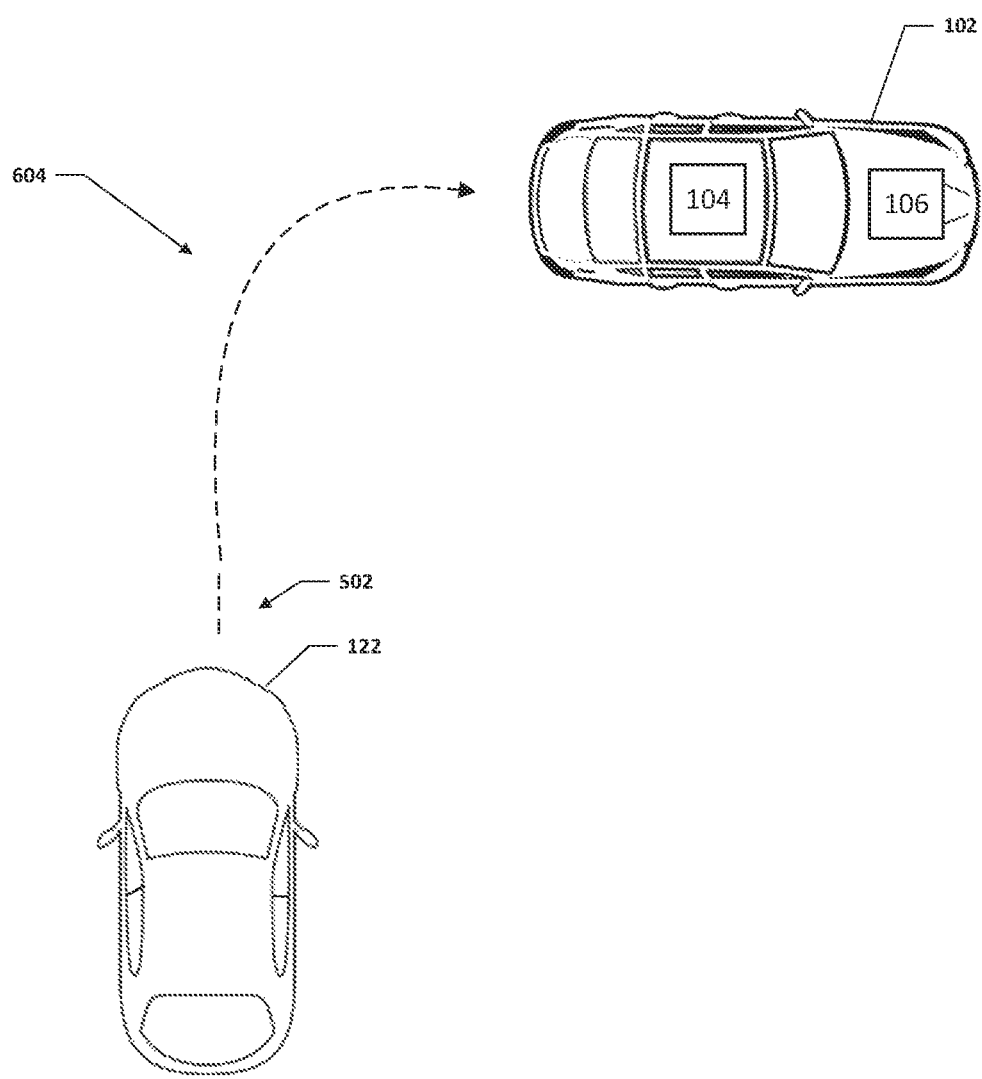

FIGS. 6A and 6B illustrate an example system summary according to some embodiments of the present disclosure. In an example, a third-party vehicle 122 can be following AV 102. The AV 102 can include the onboard controller and the sensor suite 106. In an example, as shown in FIG. 6A, the AV 102 can be traveling in a relatively straight line 502. Before the AV 102 makes a right hand turn 604, as shown in FIG. 6B, the AV 102 can send a signal 602 to the third-party vehicle 122 that the AV 102 intends to make a right hand turn 604. The signal 602 can be a quick flash of a light that is imperceivable by a human but can be detected by the third-party vehicle 122, a short burst of infrared light, a wireless signal can be detected by the third-party vehicle 122, a change is a sensor in the sensor suite 106 of the AV 102, or some other signal 602 or indicator of the AV 102 intends to make the right hand turn 604. The signal 602 is in addition to or in place of a blinker or turn signal.

While FIGS. 6A and 6B illustrate the behavior of the AV 102 using the signal 602 as a behavior that shows an intent of the AV 102 making a right hand turn 604, other behaviors of the AV 102 may be used to indicate to the third-party vehicle 122 an intent of the AV 102 to make a right-hand turn. For example, the LIDAR on the AV 102 may change (e.g., the LIDAR may turn on or off, the range of the LIDAR may change, etc.), the cameras on the AV 102 may shift or move to move the viewpoint of the camera, or some other behaviors of the AV 102 that may be recognized by the third-party vehicle 122 that indicate an intent of the AV 102 to make a right-hand turn. Also, different behaviors can be used by the AV 102 that shown an intent to the third-party vehicle 122. For example, if the AV 102 is going to speed up or slow down, one or more sensors on the AV 102 may change or one or more sensors on the AV 102 may become active.

Example Process

Figure 7:
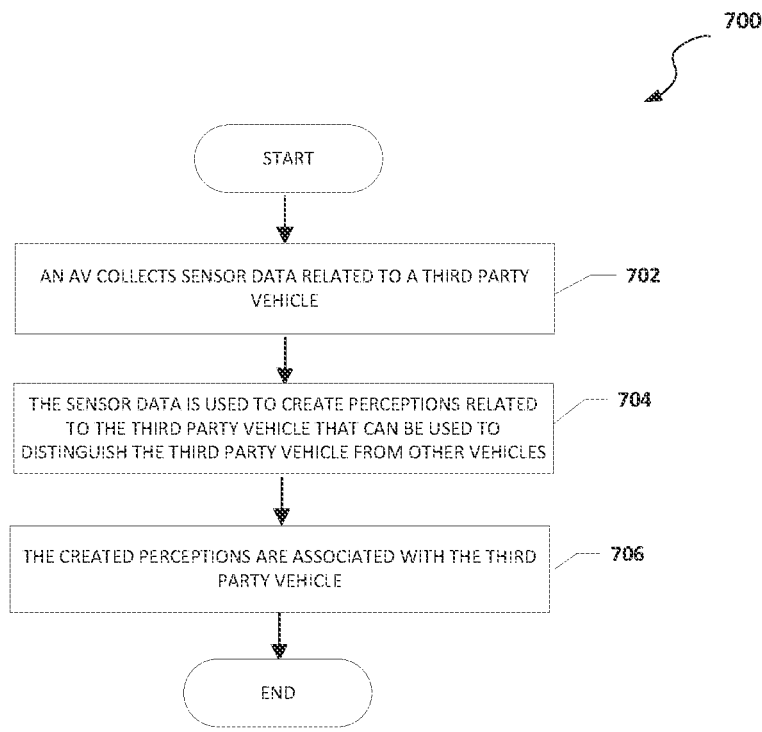
FIG. 7 is a flowchart showing a process for determining an intent of a third-party autonomous vehicle according to some embodiments of the present disclosure.

FIG. 7 is an example flowchart illustrating possible operations of a flow 700 that may be associated with determining an intent of a third-party autonomous vehicle, in accordance with an embodiment. In an embodiment, one or more operations of flow 700 may be performed by the AV 102, the onboard controller 104, the sensor suite 106, and the fleet management system 108.

At 702, an AV collects sensor data related to a third-party vehicle. For example, the sensor suite 106 on the AV 102 can collect sensor data related to the third-party vehicle 122. At 704, the sensor data is used to create perceptions related to the third-party vehicle that can be used to distinguish the third-party vehicle from other vehicles. For example, using the collected sensor data relative to the third-party vehicle 122 by the sensor suite 106 of the AV 102, the third-party behavior signature module 206 in the fleet management system 108 can be trained to identity the specific type of third-party vehicle 122. The collected sensor data relative to the third-party vehicle 122 by the sensor suite 106 can include images of the third-party vehicle 122, radar signals collected from the third-party vehicle 122, audio signals collected from the third-party vehicle 122, as well as other data collected by the sensor suite 106 that can be used by the third-party behavior signature module 206. For example, detected wireless signals from the third-party vehicle 122 may be used to identify a third-party vehicle 122. For example, a third-party vehicle 122 may emit a Bluetooth signal or beacon signal that includes an identifier of the third-party vehicle 122. At 706, the created perceptions are associated with the third-party vehicle. For example, the collected sensor data that can be used to identify the third-party vehicle 122 can be associated with the third-party vehicle 122 and stored in the third-party vehicle behavior signatures database 320.

Figure 8:
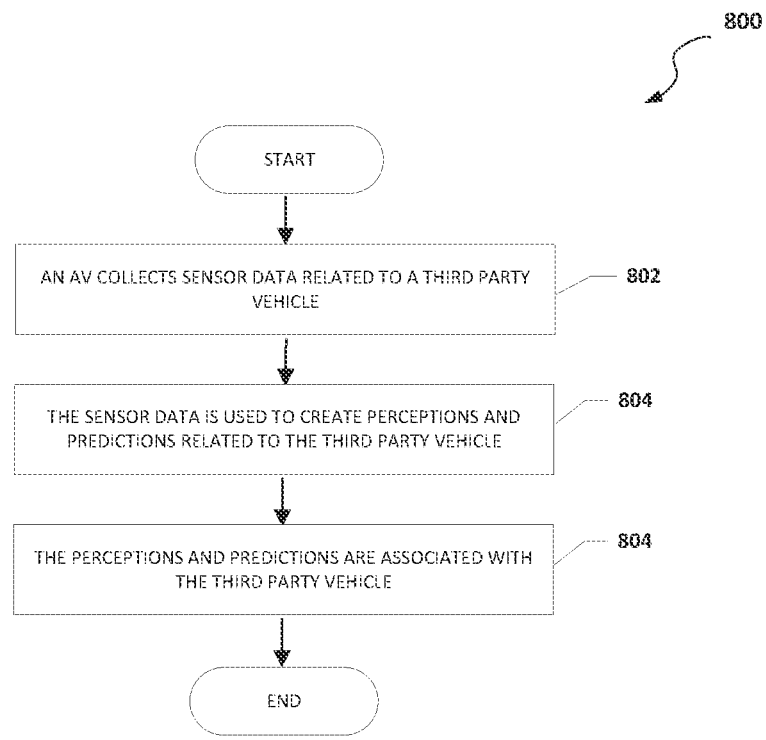
FIG. 8 is a flowchart showing a process for determining an intent of a third-party autonomous vehicle according to some embodiments of the present disclosure.

FIG. 8 is an example flowchart illustrating possible operations of a flow 800 that may be associated with determining an intent of a third-party autonomous vehicle, in accordance with an embodiment. In an embodiment, one or more operations of flow 800 may be performed by the AV 102, the onboard controller 104, the sensor suite 106, and the fleet management system 108.

At 802, an AV collects sensor data related to a third-party vehicle. For example, the sensor suite 106 on the AV 102 can collect sensor data related to the third-party vehicle 122. At 804, the sensor data is used to create perceptions and predictions related to the third-party vehicle. For example, using the collected sensor data relative to the third-party vehicle 122 by the sensor suite 106 of the AV 102, the third-party behavior signature module 206 in the fleet management system 108 can identify the third-party vehicle 122 and create perceptions and predictions related to the third-party vehicle 122. More specifically, the perception of the third-party vehicle 122 traveling in a relatively straight line 502 (as illustrated in FIG. 5A), the third-party vehicle 122 making a small turn to the right and then to the left 504 and deviating from traveling along the relatively straight line 502 (as illustrated in FIG. 5B) can be a created perception and the prediction can be that the third-party vehicle 122 will make a right hand turn 506 (as illustrated in FIG. 5C). At 806, the perceptions and predictions are associated with the third-party vehicle. For example, the collected sensor data that can be used to identify the behavior and perceptions of third-party vehicle 122 and the predictions of the intent of the third-party vehicle 122 based on the behavior and perceptions of third-party vehicle 122 can be associated with the third-party vehicle 122 and stored in the third-party vehicle behavior signatures database 320.

Figure 9:
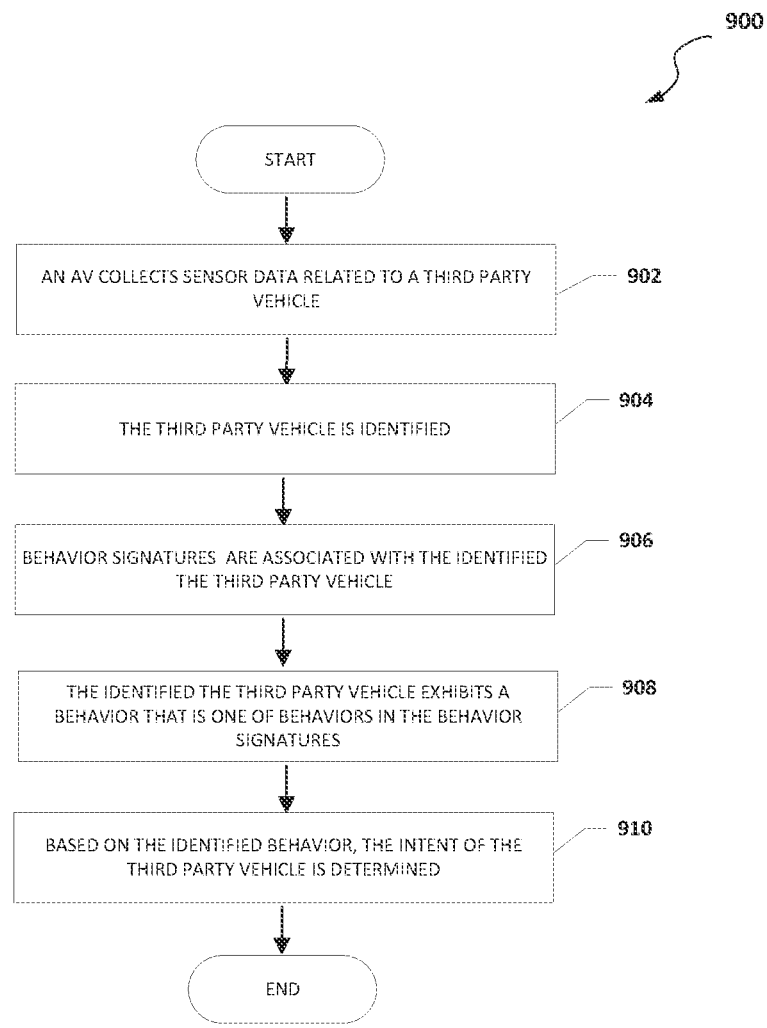
FIG. 9 is a flowchart showing a process for determining an intent of a third-party autonomous vehicle according to some embodiments of the present disclosure.

FIG. 9 is an example flowchart illustrating possible operations of a flow 900 that may be associated with determining an intent of a third-party autonomous vehicle, in accordance with an embodiment. In an embodiment, one or more operations of flow 900 may be performed by the AV 102, the onboard controller 104, the sensor suite 106, and the fleet management system 108.

At 902, an AV collects sensor data related to a third-party vehicle. For example, the sensor suite 106 on the AV 102 can collect sensor data related to the third-party vehicle 122. At 904, the third-party vehicle is identified. For example, based on an image of the third-party vehicle 122 acquired by sensors in the sensor suite 106, the third-party vehicle 122 can be identified. At 906, behavior signatures are associated with the identified third-party vehicle. For example, behavior signatures 224 for the identified third-party vehicle can be acquired from the third-party vehicle behavior signature database 320. At 908, the identified third-party vehicle exhibits a behavior that is one of the behaviors in the behavior signatures for the identified third-party vehicle. For example, one of the behaviors that is part of the behavior signatures 224 in the third-party vehicle behavior signature database 320 for the third-party vehicle 122 may be to travel in a relatively straight line 502 (as illustrated in FIG. 5A) and then make a small turn to the right and then to the left 504 and deviate from traveling along the relatively straight line 502 (as illustrated in FIG. 5B). At 910, based on the identified behavior, the intent of the third-party vehicle is determined. For example, based on the identified behavior of the third-party vehicle 122 traveling in a relatively straight line 502 (as illustrated in FIG. 5A) and then making a small turn to the right and then to the left 504 and deviate from traveling along the relatively straight line 502 (as illustrated in FIG. 5B), the intent of the third-party vehicle 122 to make a right hand turn 506 (as illustrated in FIG. 5C) can be determined.

Figure 10:
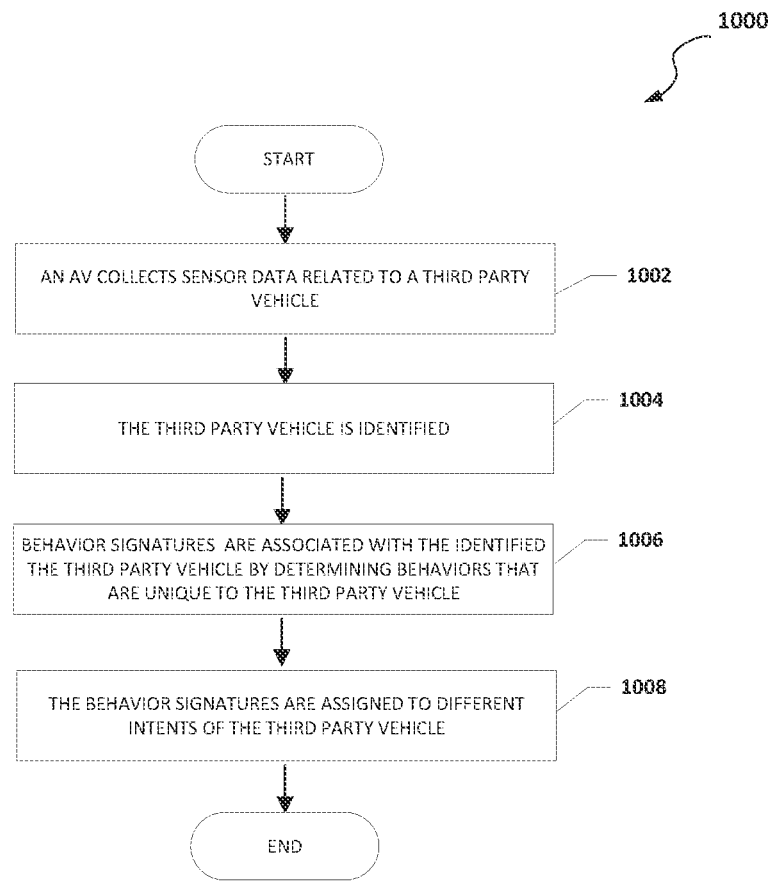
FIG. 10 is a flowchart showing a process for determining an intent of a third-party autonomous vehicle according to some embodiments of the present disclosure.

FIG. 10 is an example flowchart illustrating possible operations of a flow 1000 that may be associated with determining an intent of a third-party autonomous vehicle, in accordance with an embodiment. In an embodiment, one or more operations of flow 1000 may be performed by the AV 102, the onboard controller 104, the sensor suite 106, and the fleet management system 108.

At 1002, an AV collects sensor data related to a third-party vehicle. For example, the sensor suite 106 on the AV 102 can collect sensor data related to the third-party vehicle 122. At 1004, the third-party vehicle is identified. For example, based on an image of the third-party vehicle 122 acquired by sensors in the sensor suite 106, the third-party vehicle 122 can be identified. At 1006, behavior signatures are associated with the identified third-party vehicle by determining behaviors that are unique to the third-party vehicle. For example, using the collected sensor data related to the third-party vehicle 122, behavior signatures 224 of the third-party vehicle 122 that precede a specific action of the third-party vehicle 122 can be identified. More specifically, the collected sensor data related to the third-party vehicle 122 may reveal that before the third-party vehicle 122 makes a right-hand turn, the third-party vehicle 122 travels in a relatively straight line 502 (as illustrated in FIG. 5A) and then makes a small turn to the right and then to the left 504 and deviates from traveling along the relatively straight line 502 (as illustrated in FIG. 5B). The behavior of the third-party vehicle 122 traveling in a relatively straight line 502 (as illustrated in FIG. 5A) and then making a small turn to the right and then to the left 504 before making a right-hand turn can be determined to be a behavior signature 224 of the third-party vehicle 122. In some examples, the behavior signature 224 can be recognized using machine learning. At 1008, the behavior signatures are assigned to different intents of the third-party vehicle. For example, behavior of the third-party vehicle 122 traveling in a relatively straight line 502 (as illustrated in FIG. 5A) and then making a small turn to the right and then to the left 504 before making a right-hand turn can be determined to be a behavior signature 224 and the behavior signature 224 can be assigned to an intent to make a right hand turn by the third-party vehicle 122. In some examples, the behavior signatures 224 are determined from behaviors of the third-party vehicle 122 that are safe and have good comfort scores. For example, the behavior signature may include driving on a particular side of the road, slightly swerving on the road before making a turn or switching lanes, operating the lights, horn, LIDAR, Radar, or some other indicator or sensor in a specific pattern or configuration. For sensor related behavior signatures, a type and sensor configuration that indicates the behavior signature can be determined from perception data using perception cues. In addition, for the sensor related behavior signatures, a type and sensor configuration that indicates the behavior signature can be determined from time-based data using behavioral cues. The behavior signatures for intents that are safety critical can be prioritized. For example, the behavior signatures of the third-party vehicle that indicate an intent of the third-party vehicle 122 to hard brake, turn right or left, change lanes, etc. can be prioritized. A combination of unique behavior signatures by the third-party vehicle can be assigned to an intent of the third-party vehicle.

Figure 11:
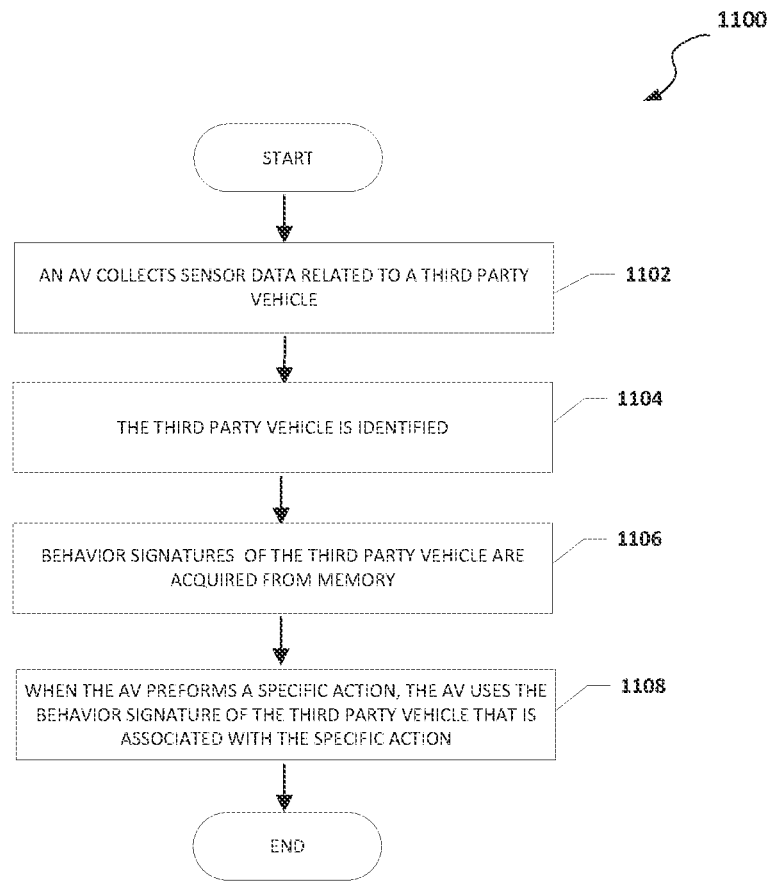
FIG. 11 is a flowchart showing a process for determining an intent of a third-party autonomous vehicle according to some embodiments of the present disclosure.

FIG. 11 is an example flowchart illustrating possible operations of a flow 1100 that may be associated with determining an intent of a third-party autonomous vehicle, in accordance with an embodiment. In an embodiment, one or more operations of flow 1100 may be performed by the AV 102, the onboard controller 104, the sensor suite 106, and the fleet management system 108.

At 1102, an AV collects sensor data related to a third-party vehicle. For example, the sensor suite 106 on the AV 102 can collect sensor data related to the third-party vehicle 122. At 1104, the third-party vehicle is identified. For example, based on an image of the third-party vehicle 122 acquired by sensors in the sensor suite 106, the third-party vehicle 122 can be identified. At 1106, behavior signatures of the identified third-party vehicle are acquired from memory. For example, stored behavior signatures 224 of the third-party vehicle 122 can be acquired from the third-party vehicle behavior signatures database 214 in the fleet management system 108. In another example, the stored behavior signature 224 of the third-party vehicle 122 can be acquired from the third-party vehicle behavior signatures database 320 in the onboard controller 104. At 1108, when the AV preforms a specific action, the AV uses the behavior signature of the third-party vehicle that is associated with the specific action. For example, if a behavior signature of the third-party vehicle 122 for making a right-hand turn is to travel in a relatively straight line 502 (as illustrated in FIG. 5A) and then make a small turn to the right and then to the left 504 before making the right-hand turn, the AV 102 can copy the behavior signature before making a right-hand turn to sign an intent to the third-party vehicle 122 that the AV 102 intends to make a right-hand turn.

Figure 12:
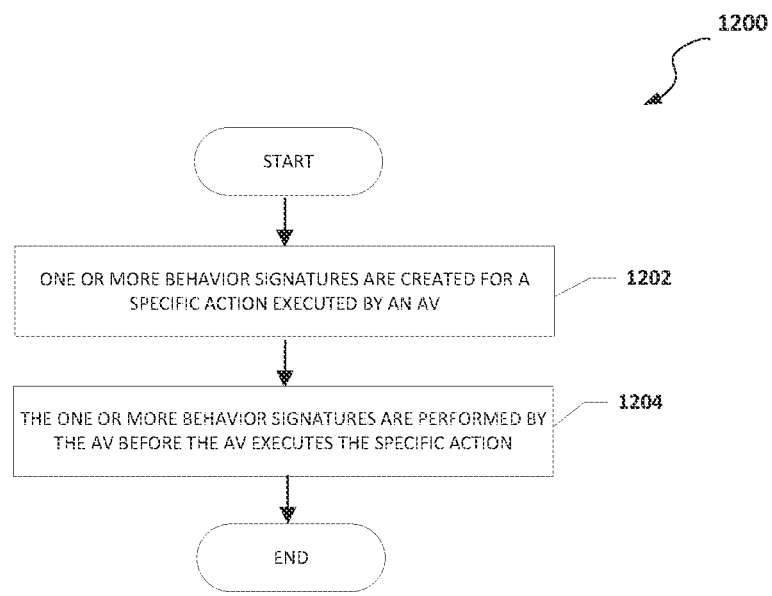
FIG. 12 is a flowchart showing a process for determining an intent of a third-party autonomous vehicle according to some embodiments of the present disclosure.

FIG. 12 is an example flowchart illustrating possible operations of a flow 1200 that may be associated with determining an intent of a third-party autonomous vehicle, in accordance with an embodiment. In an embodiment, one or more operations of flow 1200 may be performed by the AV 102, the onboard controller 104, the sensor suite 106, and the fleet management system 108.

At 1102, one or more behavior signatures are created for a specific action executed by an AV. For example, one or more behavior signatures are created for a specific action executed by the AV 102. The one or more behavior signatures may be actions the AV 102 already performs before the specific action is executed by the AV 102 or may be newly created actions for the AV 102 to perform before the specific action is executed. For example, before the AV 102 does a hard brake, the AV 102 may cause the brake lights to flash in rapid succession. In some examples, the flashing of the brake lights in rapid succession may be undetectable by a human user but can be detected by a third-party vehicle 122. At 1204, the one or more behavior signatures are performed by the AV before the AV executes the specific action. For example, before the AV 102 executes a hard brake, the AV 102 can flash the brake lights in rapid succession. The created behavior signatures can be performed by the AV 102 al all times or whenever it is possible for the AV 102 to perform the created behavior signatures. In some examples, the created behavior signatures are produced when the AV 102 will execute an unexpected action (e.g., a rapid lane change, emergency braking in the middle of a road, etc.). In some examples, the AV 102 is part of a fleet of AVs 102 and the fleet of AVs 102 all use the same behavior signatures. Also, the created behavior signatures can be communicated to operators of the third-party vehicle so the third-party vehicle can use the same behavior signatures as the AV 102.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configure ration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configure ration (e.g., programmable) elements arranged in a structure that supports these functions. The software or firmware providing the emulation may be provided on non-transitory computer-readable storage medium comprising instructions to allow a processor to carry out those functionalities.

Additionally, one or more of the AV 102, the onboard controller 104, the sensor suite 106, the fleet management system 108, and the user device 112 may include one or more processors that can execute software, logic, or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an application specific integrated circuit (ASIC) that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Each of the AV 102, the onboard controller 104, the sensor suite 106, the fleet management system 108, and the user device 112 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Each of the AV 102, the onboard controller 104, the sensor suite 106, the fleet management system 108, and the user device 112 can include memory elements for storing information to be used in the operations outlined herein. The AV 102, the onboard controller 104, the sensor suite 106, the fleet management system 108, and the user device 112 may keep information in any suitable memory element (e.g., random access memory (RAM), read-only memory (ROM), erasable programmable ROM (EPROM), electrically erasable programmable ROM (EEPROM), ASIC, etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in the AV 102, the onboard controller 104, the sensor suite 106, the fleet management system 108, and the user device 112 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these examples, memory elements can store data used for the operations described herein. This includes the memory elements being able to store software, logic, code, or processor instructions that are executed to carry out the activities described herein.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

Other Notes and Examples

Example M1 is a method including capturing sensor data related to the third-party vehicle, identifying the third-party vehicle, identifying a behavior signature associated with the third-party vehicle, analyzing the captured sensor data to determine behaviors of the third-party vehicle, and using the behavior signature associated with the third-party vehicle to determine if the behaviors of the third-party vehicle indicate a specific intent of the third-party vehicle.

In Example M2, the subject matter of Example M1 can optionally include identifying behaviors of the third-party vehicle that precede an intent of the third-party vehicle and associating the behaviors with the intent of the third-party vehicle to create a behavior signature for the third-party vehicle.

In Example M3, the subject matter of Example M1 can optionally include where the behaviors associated with the intent are not perceivable by a person.

In Example M4, the subject matter of Example M1 can optionally include where the third-party vehicle is identified using a visual image from camera sensors.

In Example M5, the subject matter of Example M1 can optionally include where the third-party vehicle is identified using wireless signals originating from the third-party vehicle.

In Example, M6, the subject matter of Example M1 can optionally include where the behavior signature is stored in a network element.

In Example, M7, the subject matter of Example M1 can optionally include where the behavior signature is communicated to the vehicle after the third-party vehicle is identified by the vehicle.

In Example, M8, the subject matter of Example M1 can optionally include where the third-party vehicle is an autonomous vehicle.

In Example, M9, the subject matter of Example M1 can optionally where the behavior signature of the third-party vehicle is are unique to the third-party vehicle.

In Example, M10, the subject matter of Example M1 can optionally include where the vehicle is not in direct communication with the third-party vehicle.

In Example M11, the subject matter of any of Examples M1-M2 can optionally include where the behaviors associated with the intent are not perceivable by a person.

In Example M12, the subject matter of any of Examples M1-M3 can optionally include where the third-party vehicle is identified using a visual image from camera sensors.

In Example M13, the subject matter of any of Examples M1-M4 can optionally include where the third-party vehicle is identified using wireless signals originating from the third-party vehicle.

In Example M14, the subject matter of any of Examples M1-M5 can optionally include where the behavior signature is stored in a network element.

In Example, M15, the subject matter of Examples M1-M6 can optionally include where the behavior signature is communicated to the vehicle after the third-party vehicle is identified by the vehicle In Example, M16, the subject matter of any of Examples M1-M7 can optionally include where the third-party vehicle is an autonomous vehicle.

In Example, M17, the subject matter of Examples M1-M8 can optionally where the behavior signature of the third-party vehicle is are unique to the third-party vehicle.

In Example, M18, the subject matter of any of the Examples M1-M9 can optionally include where the vehicle is not in direct communication with the third-party vehicle.

Example A1, is a vehicle for determining an intent of a third-party autonomous vehicle, the vehicle comprising a sensor suite including external vehicle sensors to sense an environment and generate sensor data, wherein the environment includes the third-party autonomous vehicle and a perception system to determine a specific identity of the third-party autonomous vehicle, determine a behavior of the third-party autonomous vehicle, and predict an action by the third-party autonomous vehicle based on the specific identity of the third-party autonomous vehicle and the determined behavior of the third-party autonomous vehicle.

In Example A2, the subject matter of Example A1 can optionally include where the determined behavior of the third-party autonomous vehicle is not perceivable by a person.

In Example A3, the subject matter of Example A1 can optionally include where the third-party autonomous vehicle is identified using a visual image from camera sensors in the sensor suite.

In Example A4, the subject matter of Example A3 can optionally include where the third-party autonomous vehicle is identified using light detection and ranging (LIDAR).

In Example A5, the subject matter of Example A1 can optionally include where the third-party autonomous vehicle is identified using wireless signals originating from the third-party autonomous vehicle.

In Example A6, the subject matter of any of Example A1 can optionally include a third-party autonomous vehicle behavior signature, wherein the third-party autonomous vehicle behavior signature is associated with the third-party autonomous vehicle and is used to predict the action by the third-party autonomous vehicle based on the specific identity of the third-party autonomous vehicle and the determined behavior of the third-party autonomous vehicle.

In Example A7, the subject matter of Example A6 can optionally include where the third-party autonomous vehicle behavior signature was created by previously identifying behaviors of the third-party autonomous vehicle and associating the behaviors with an intent of the third-party autonomous vehicle.

In Example A8, the subject matter of Example A6 can optionally include where the third-party autonomous vehicle behavior signature is stored in a network element.

In Example A9, the subject matter of Example A6 can optionally include where the third-party autonomous vehicle behavior signature is communicated to the vehicle after the third-party autonomous vehicle is identified by the vehicle.

In Example A10, the subject matter of Example A1 can optionally include where the determined behavior of the third-party autonomous vehicle is are unique to the third-party autonomous vehicle.

In Example A11, the subject matter of Example A1 can optionally include where the vehicle is not in direct communication with the third-party autonomous vehicle.

In Example A12, the subject matter of Example A1 can optionally include where the vehicle is an autonomous vehicle.

In Example A13, the subject matter of any of Examples A1-A2 can optionally include where the third-party autonomous vehicle is identified using a visual image from camera sensors in the sensor suite.

In Example A14, the subject matter of any of Examples A1-A3 can optionally include where the third-party autonomous vehicle is identified using light detection and ranging (LIDAR).

In Example A15, the subject matter of any of Examples A1-A4 can optionally include where the third-party autonomous vehicle is identified using wireless signals originating from the third-party autonomous vehicle.

In Example A16, the subject matter of any of Examples A1-A5 can optionally include a third-party autonomous vehicle behavior signature, wherein the third-party autonomous vehicle behavior signature is associated with the third-party autonomous vehicle and is used to predict the action by the third-party autonomous vehicle based on the specific identity of the third-party autonomous vehicle and the determined behavior of the third-party autonomous vehicle.

In Example A17, the subject matter of any of Examples A1-A6 can optionally include where the third-party autonomous vehicle behavior signature was created by previously identifying behaviors of the third-party autonomous vehicle and associating the behaviors with an intent of the third-party autonomous vehicle.

In Example A18, the subject matter of any of Examples A1-A7 can optionally include where the third-party autonomous vehicle behavior signature is stored in a network element.

In Example A19, the subject matter of any of Examples A1-A8 can optionally include where the third-party autonomous vehicle behavior signature is communicated to the vehicle after the third-party autonomous vehicle is identified by the vehicle.

In Example A20, the subject matter of any of Examples A1-A9 can optionally include where the determined behavior of the third-party autonomous vehicle is are unique to the third-party autonomous vehicle.

In Example A21, the subject matter of any of Examples A1-A10 can optionally include where the vehicle is not in direct communication with the third-party autonomous vehicle.

In Example A22, the subject matter of any of Examples A1-A11 can optionally include where the vehicle is an autonomous vehicle.

Example MM1 is a method including training a system to identify a specific third-party autonomous vehicle using data collected by a sensor suite on an autonomous vehicle, training the system to recognize one or more behaviors of the specific third-party autonomous vehicle that precede a specific action by the specific third-party autonomous vehicle, and create a behavior signature for the specific third-party autonomous vehicle, wherein the behavior signature includes features of the specific third-party autonomous vehicle that can be used to recognize the specific third-party autonomous vehicle, the recognized one or more behaviors, and the specific action.

In Example MM2, the subject matter of Example MM1 can optionally include communicating the behavior signature to the autonomous vehicle, identifying the specific third-party autonomous vehicle using data collected by a sensor suite on an autonomous vehicle, identifying when the specific third-party autonomous vehicle exhibits the one or more behaviors, and determining an intent of the specific third-party autonomous vehicle to perform the specific action in the behavior signature that is associated with the one or more behaviors.

In Example MM3, the subject matter of Example MM2 can optionally include where the one or more behaviors exhibited by the third-party autonomous vehicle are not perceivable by a person.

In Example MM4, the subject matter of Example MM1 can optionally include where the third-party autonomous vehicle is identified using a visual image from camera sensors in the sensor suite.

In Example MM5, the subject matter of any of Example MM4 can optionally include where the third-party autonomous vehicle is identified using wireless signals originating from the third-party autonomous vehicle.

In Example, MM6, the subject matter of Example MM1 can optionally include where the one or more behaviors of the specific third-party autonomous vehicle are unique to the third-party autonomous vehicle.

In Example, MM7, the subject matter of Example MM6 can optionally include where the autonomous vehicle is not in direct communication with the third-party autonomous vehicle.

In Example MM8, the subject matter of any of the Examples MM1-MM2 can optionally include where the one or more behaviors exhibited by the third-party autonomous vehicle are not perceivable by a person.

In Example MM9, the subject matter of any of the Examples MM1-MM3 can optionally include where the third-party autonomous vehicle is identified using a visual image from camera sensors in the sensor suite.

In Example MM10, the subject matter of any of the Examples MM1-MM4 can optionally include where the third-party autonomous vehicle is identified using wireless signals originating from the third-party autonomous vehicle.

In Example, MM11, the subject matter of any of the Examples MM1-MM5 can optionally include where the one or more behaviors of the specific third-party autonomous vehicle are unique to the third-party autonomous vehicle.

In Example, MM12, the subject matter of any of the Examples MM1-MM6 can optionally include where the autonomous vehicle is not in direct communication with the third-party autonomous vehicle.

Example AA1 is a device including at least one machine-readable medium comprising one or more instructions that, when executed by at least one processor, causes the at least one processor to identify a third-party autonomous vehicle using a sensor suite on an autonomous vehicle, identify a third-party autonomous vehicle behavior signature associated with the third-party autonomous vehicle, capture sensor data related to one or more behaviors of the third-party autonomous vehicle, analyze the captured sensor data to determine if the one or more behaviors of the third-party autonomous vehicle are included in the third-party autonomous vehicle behavior signature, and use the third-party autonomous vehicle behavior signature to predict an intent or action of the third-party autonomous vehicle.

In Example AA2, the subject matter of Example AA1 can optionally include where the one or more behaviors of the third-party autonomous vehicle are not perceivable by a person.

In Example AA3, the subject matter of Example AA2 can optionally include where the third-party autonomous vehicle is identified using a visual image from camera sensors in the sensor suite.

In Example AA4, the subject matter of Example AA1 can optionally include where the one or more behaviors of the third-party autonomous vehicle is are unique to the third-party autonomous vehicle.

In Example AA5, the subject matter of Example AA1 can optionally include where the autonomous vehicle is not in direct communication with the third-party autonomous vehicle.

In Example AA6, the subject matter of any of Examples AA1-AA2 can optionally include where the third-party autonomous vehicle is identified using a visual image from camera sensors in the sensor suite.

In Example AA7, the subject matter of any of Examples AA1-AA3 can optionally include where the one or more behaviors of the third-party autonomous vehicle is are unique to the third-party autonomous vehicle.

In Example AA8, the subject matter of any of Examples AA1-AA4 can optionally include where the autonomous vehicle is not in direct communication with the third-party autonomous vehicle.

Example MMM-1 is a method including determining that an autonomous vehicle is preparing to perform an action, determining an indicator that is not perceivable by a human but is perceivable by a third-party autonomous vehicle, and activating the indicator before the action is performed.

In Example MMM2, the subject matter of Example MMM1 can optionally include where the autonomous vehicle is not in direct communication with the third-party autonomous vehicle.

In Example MMM3, the subject matter of Example MMM2 can optionally include where the indicator is a short burst of infrared light.

In Example MMM4, the subject matter of Example MMM1 can optionally include where the autonomous vehicle detects a third-party autonomous vehicle and copies one or more indicators the third-party autonomous vehicle activates before the action is performed.

In Example MMM5, the subject matter of any of Example MMM4 can optionally include where the autonomous vehicle learns one or more indicators the third-party autonomous vehicle activates before the action is performed from previous observations of the third-party autonomous vehicle.

In Example, MMM6, the subject matter of Example MMM1 can optionally include where the indicator is part of a behavior signature associated with the autonomous vehicle.

In Example, MMM7, the subject matter of any of the Examples MMM1-MMM2 can optionally include where the indicator is a short burst of infrared light.

In Example MMM8, the subject matter of any of the Examples MMM1-MMM3 can optionally include where the autonomous vehicle detects a third-party autonomous vehicle and copies one or more indicators the third-party autonomous vehicle activates before the action is performed.

In Example MMM9, the subject matter of any of the Examples MMM1-MMM4 can optionally include where the autonomous vehicle learns one or more indicators the third-party autonomous vehicle activates before the action is performed from previous observations of the third-party autonomous vehicle.

In Example, MMM10, the subject matter of any of the Examples MMM1-MMM5 can optionally include where the indicator is part of a behavior signature associated with the autonomous vehicle.

Example 4M-1 is a method including collecting sensor data related to a third-party vehicle, identifying the third-party vehicle, and creating behavior signatures for the third-party vehicle using the collected sensor data, wherein the behavior signatures include one or more actions the third-party vehicle performs before executing a specific action.

In Example 4M-2, the subject matter of Example 4M-1 can optionally include where the behavior signature associated with the one or more actions the third-party vehicle performs before executing a specific action are not perceivable by a person.

In Example 4M-3, the subject matter of Example 4M-2 can optionally include where the behavior signatures are stored in a network element.

In Example 4M-4, the subject matter of Example 4M-1 can optionally include where the behavior signatures are stored in an autonomous vehicle that collects the sensor data related to the third-party vehicle.

In Example 4M-5, the subject matter of any of the Examples 4M-1-4M-2 can optionally include where the behavior signatures are stored in a network element.

In Example 4M-6, the subject matter of any of the Examples 4M-1-4M-3 can optionally include where the behavior signatures are stored in an autonomous vehicle that collects the sensor data related to the third-party vehicle.

Example 5M-1 is a method including collecting sensor data related to a third-party vehicle, identifying the third-party vehicle, acquiring behavior signatures for the third-party vehicle, wherein the behavior signatures include one or more actions the third-party vehicle performs before executing a specific action, and performing the behavior signatures before executing the specific action.

In Example 5M-2, the subject matter of Example 5M-1 can optionally include where the behavior signatures are not perceivable by a person.

In Example 5M-3, the subject matter of Example 5M-2 can optionally include where the determined behavior signatures of the third-party vehicle is are unique to the third-party vehicle.

In Example 5M-4, the subject matter of Example 5M-1 can optionally include where the behavior signatures are performed by an autonomous vehicle before executing the specific action.

In Example 5M-5, the subject matter of Example 5M-1 can optionally include where the autonomous vehicle is not in direct communication with the third-party vehicle.

In Example 5M-6, the subject matter of Example 5M-1 can optionally include where the third-party vehicle is an autonomous vehicle.

In Example 5M-7, the subject matter of any of the Examples 5M-1-5M-2 can optionally include where the determined behavior signatures of the third-party vehicle is are unique to the third-party vehicle.

In Example 5M-8, the subject matter of any of the Examples 5M-1-5M-3 can optionally include where the behavior signatures are performed by an autonomous vehicle before executing the specific action.

In Example 5M-9, the subject matter of any of the Examples 5M-1-5M-4 can optionally include where the autonomous vehicle is not in direct communication with the third-party vehicle.

In Example 5M-10, the subject matter of any of the Examples 5M-1-5M-5 can optionally include where the third-party vehicle is an autonomous vehicle.

What is claimed is:

1. A method for determining an intent of a third-party vehicle by a vehicle, the method comprising:
    capturing sensor data related to the third-party vehicle;
    identifying the third-party vehicle;
    identifying a behavior signature associated with the third-party vehicle;
    analyzing the captured sensor data to determine behaviors of the third-party vehicle; and
    using the behavior signature associated with the third-party vehicle to determine if the behaviors of the third-party vehicle indicate a specific intent of the third-party vehicle.

2. The method of claim 1, wherein the behavior signature is created by:
    identifying behaviors of the third-party vehicle that precede an intent of the third-party vehicle; and
    associating the behaviors with the intent of the third-party vehicle to create a behavior signature for the third-party vehicle.

3. The method of claim 1, wherein the behaviors associated with the intent are not perceivable by a person.

4. The method of claim 3, wherein the third-party vehicle is identified using a visual image from camera sensors.

5. The method of claim 1, wherein the third-party vehicle is identified using wireless signals originating from the third-party vehicle.

6. The method of claim 1, wherein the behavior signature is stored in a network element.

7. The method of claim 6, wherein the behavior signature is communicated to the vehicle after the third-party vehicle is identified by the vehicle.

8. The method of claim 1, wherein the third-party vehicle is an autonomous vehicle.

9. The method of claim 1, wherein the behavior signature of the third-party vehicle is unique to the third-party vehicle.

10. The method of claim 1, wherein the vehicle is not in direct communication with the third-party vehicle.

11. A vehicle for determining an intent of a third-party autonomous vehicle, comprising:
    a sensor suite including external vehicle sensors to sense an environment and generate sensor data, wherein the environment includes the third-party autonomous vehicle; and
    a perception system to:
        determine a specific identity of the third-party autonomous vehicle;
        determine a behavior of the third-party autonomous vehicle; and
        predict an action by the third-party autonomous vehicle based on the specific identity of the third-party autonomous vehicle and the determined behavior of the third-party autonomous vehicle.

12. The vehicle of claim 11, further comprising:
    a third-party autonomous vehicle behavior signature, wherein the third-party autonomous vehicle behavior signature is associated with the third-party autonomous vehicle and is used to predict the action by the third-party autonomous vehicle based on the specific identity of the third-party autonomous vehicle and the determined behavior of the third-party autonomous vehicle.

13. The vehicle of claim 12, wherein the third-party autonomous vehicle behavior signature was created by previously identifying behaviors of the third-party autonomous vehicle and associating the behaviors with an intent of the third-party autonomous vehicle.

14. The vehicle of claim 11, wherein the determined behavior of the third-party autonomous vehicle is unique to the third-party autonomous vehicle.

15. The vehicle of claim 11, wherein the vehicle is not in direct communication with the third-party autonomous vehicle.

16. The vehicle of claim 11, wherein the vehicle is an autonomous vehicle.

17. A method comprising:
    training a system to identify a specific third-party autonomous vehicle using data collected by a sensor suite on an autonomous vehicle;
    training the system to recognize one or more behaviors of the specific third-party autonomous vehicle that precede a specific action by the specific third-party autonomous vehicle; and
    create a behavior signature for the specific third-party autonomous vehicle, wherein the behavior signature includes features of the specific third-party autonomous vehicle that can be used to recognize the specific third-party autonomous vehicle, the recognized one or more behaviors, and the specific action.

18. The method of claim 17, further comprising:
    communicating the behavior signature to the autonomous vehicle;
    identifying the specific third-party autonomous vehicle using data collected by a sensor suite on an autonomous vehicle;
    identifying when the specific third-party autonomous vehicle exhibits the one or more behaviors; and determining an intent of the specific third-party autonomous vehicle to perform the specific action in the behavior signature that is associated with the one or more behaviors.

19. The method of claim 17, wherein the one or more behaviors exhibited by the third-party autonomous vehicle are not perceivable by a person.

20. The method of claim 17, wherein the one or more behaviors of the specific third-party autonomous vehicle are unique to the third-party autonomous vehicle.

* * * * *